United States Patent
Madocks

(10) Patent No.: US 11,092,245 B2
(45) Date of Patent: Aug. 17, 2021

(54) CHAMBER VALVE

(71) Applicant: General Plasma, Inc., Tucson, AZ (US)

(72) Inventor: John E. Madocks, Tucson, AZ (US)

(73) Assignee: GENERAL PLASMA INC., Tucson, AZ (US)

( * ) Notice: Subject to any disclaimer, the term of this patent is extended or adjusted under 35 U.S.C. 154(b) by 261 days.

(21) Appl. No.: 15/568,223

(22) PCT Filed: Apr. 22, 2016

(86) PCT No.: PCT/US2016/028768
§ 371 (c)(1),
(2) Date: Oct. 20, 2017

(87) PCT Pub. No.: WO2016/172429
PCT Pub. Date: Oct. 27, 2016

(65) Prior Publication Data
US 2018/0142791 A1 May 24, 2018

Related U.S. Application Data

(60) Provisional application No. 62/151,831, filed on Apr. 23, 2015.

(51) Int. Cl.
*F16K 3/06* (2006.01)
*F16K 51/02* (2006.01)
(Continued)

(52) U.S. Cl.
CPC ............. *F16K 3/06* (2013.01); *F16K 3/0218* (2013.01); *F16K 3/0254* (2013.01); *F16K 3/10* (2013.01);
(Continued)

(58) Field of Classification Search
CPC .......... F16K 3/06; F16K 3/182; F16K 3/0218; F16K 3/10; F16K 3/0254; F16K 51/02; F16K 31/52
(Continued)

(56) References Cited

U.S. PATENT DOCUMENTS 2,025,665 A * 12/1935 Dickinson ............... F16K 13/02
251/228
2,850,260 A 9/1958 Perazone et al.
(Continued)

FOREIGN PATENT DOCUMENTS

JP 2005076845 3/2005

OTHER PUBLICATIONS

International Search Report and Written Opinion dated Sep. 12, 2016, issued in PCT Patent Application No. PCT/US2016/028768, 18 pages.
(Continued)

*Primary Examiner* — John Bastianelli
(74) *Attorney, Agent, or Firm* — Nikolas J. Uhlir, Esq.; Grossman, Tucker, Perreault & Pfleger, PLLC

(57) ABSTRACT

A chamber valve (100) for use in processes requiring vacuum pressures has a compact design which minimizes the space needed for the valve in the travel direction. The chamber valve gate (116) is moveable between a first position in which the gate is offset from the portal (110), and a second position in which the gate is aligned with the portal. The gate will move into alignment with the portal while remaining within a plane parallel or nearly parallel to the portal.

14 Claims, 13 Drawing Sheets

(51) Int. Cl.
    *F16K 3/02*       (2006.01)
    *F16K 3/10*       (2006.01)
    *F16K 3/18*       (2006.01)
    *F16K 31/52*     (2006.01)

(52) U.S. Cl.
    CPC .............. *F16K 3/182* (2013.01); *F16K 31/52* (2013.01); *F16K 51/02* (2013.01)

(58) Field of Classification Search
    USPC ........ 251/228, 229, 326–329, 193, 279–280, 251/203–204
    See application file for complete search history.

(56) References Cited

U.S. PATENT DOCUMENTS

| | | |
|---|---|---|
| 3,237,916 A | 3/1966 | Bryant |
| 3,262,672 A | 7/1966 | Perazone |
| 3,352,535 A | 11/1967 | Power |
| 4,044,993 A | 8/1977 | Wheeler |
| 4,065,097 A | 12/1977 | Timin |
| 4,418,646 A | 12/1983 | Zajac |
| 4,721,282 A | 1/1988 | Shawver et al. |
| 4,753,417 A | 6/1988 | Madocks et al. |
| 4,785,962 A | 11/1988 | Toshima |
| 4,903,937 A | 2/1990 | Jakubiec et al. |
| 5,275,303 A | 1/1994 | Szalai |
| 5,899,438 A | 5/1999 | Gunder |
| 6,082,706 A | 7/2000 | Irie |
| 6,302,372 B1 | 10/2001 | Sauer et al. |
| 6,308,932 B1 | 10/2001 | Ettinger et al. |
| 6,386,511 B1 | 5/2002 | Watanabe et al. |
| 6,427,973 B1* | 8/2002 | Wagner .................. F16K 3/188 251/175 |
| 7,128,305 B2 | 10/2006 | Tomasch |
| 7,237,567 B2 | 7/2007 | Wu |
| 7,802,772 B2 | 9/2010 | Geiser |
| 8,448,918 B2* | 5/2013 | Wagner .................. F16K 51/02 251/193 |
| 8,622,368 B2 | 1/2014 | Geiser |
| 8,870,157 B2* | 10/2014 | Geiser .................... F16K 51/02 251/298 |
| 2011/0057136 A1 | 3/2011 | Ehme |
| 2011/0095220 A1 | 4/2011 | Geiser |
| 2013/0004267 A1* | 1/2013 | Tateshita ........... H01L 21/67126 414/217 |
| 2014/0183394 A1 | 7/2014 | Yamada et al. |

OTHER PUBLICATIONS

International Preliminary Report on Patentability dated Nov. 2, 2017, issued in PCT Patent Application No. PCT/US2016/028768, 11 pages.

Examination report dated Nov. 28, 2018, issued in European Patent Application No. 16 723 859.1, 4 pages.

Office Action dated Apr. 1, 2020 issued in Japanese Patent Application No. 2018-506802, 14 pages.

* cited by examiner

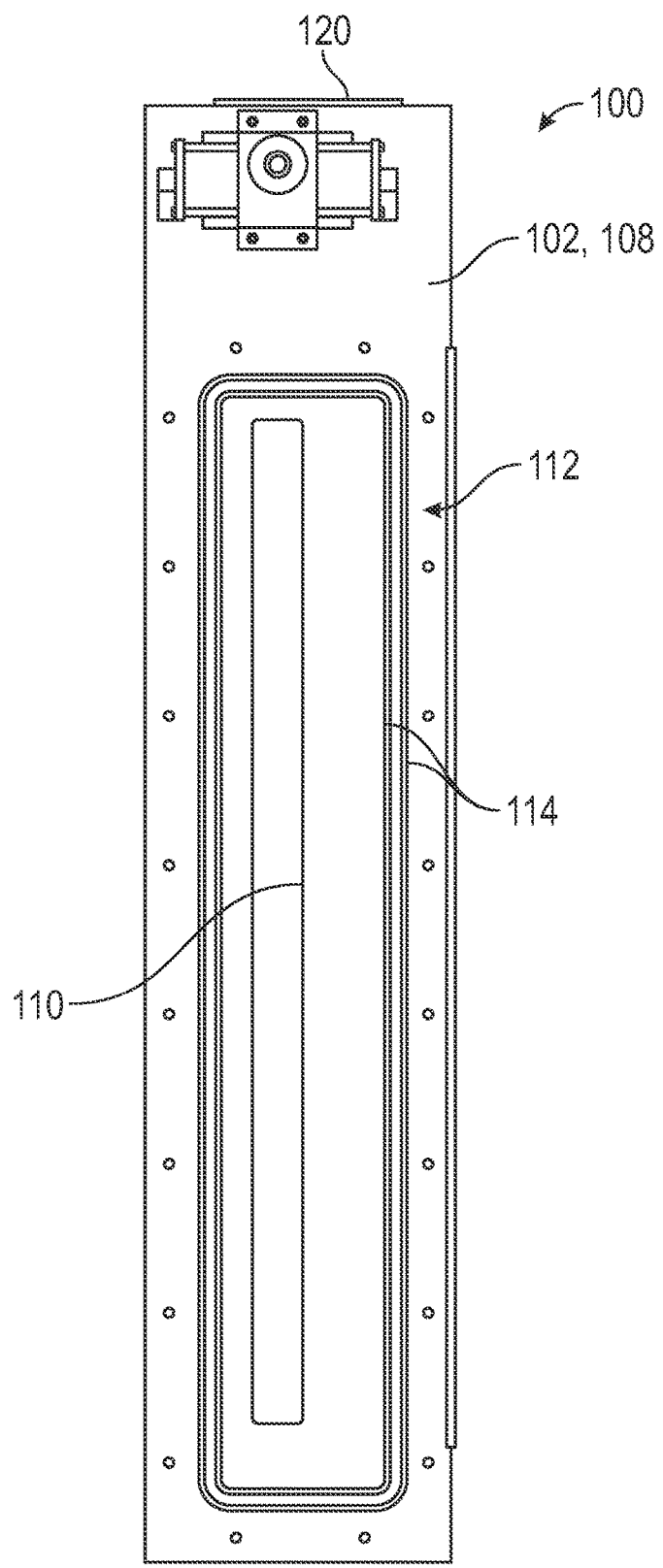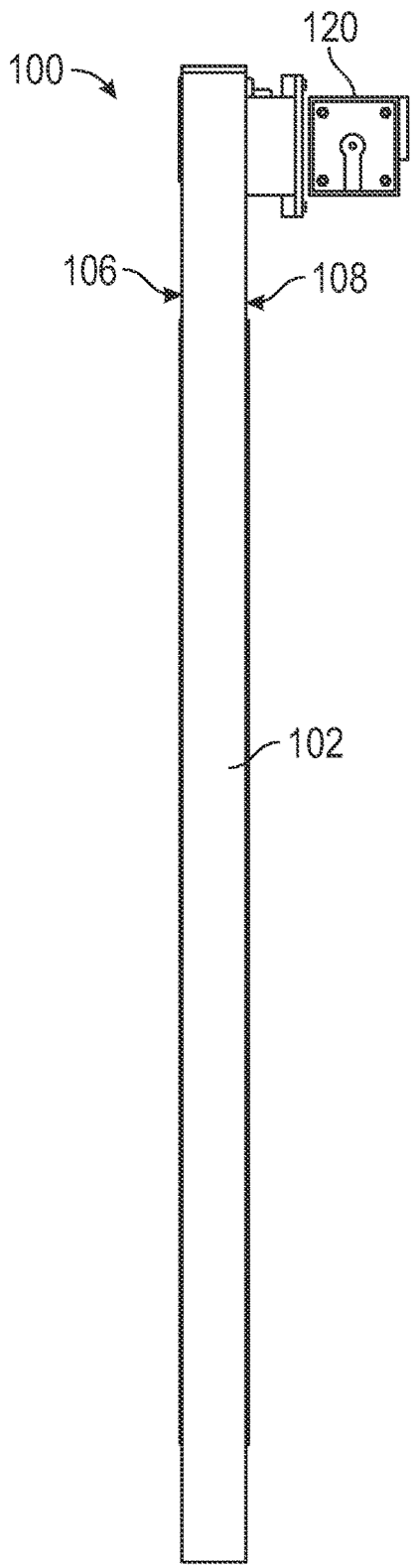
FIG. 1
FIG. 2

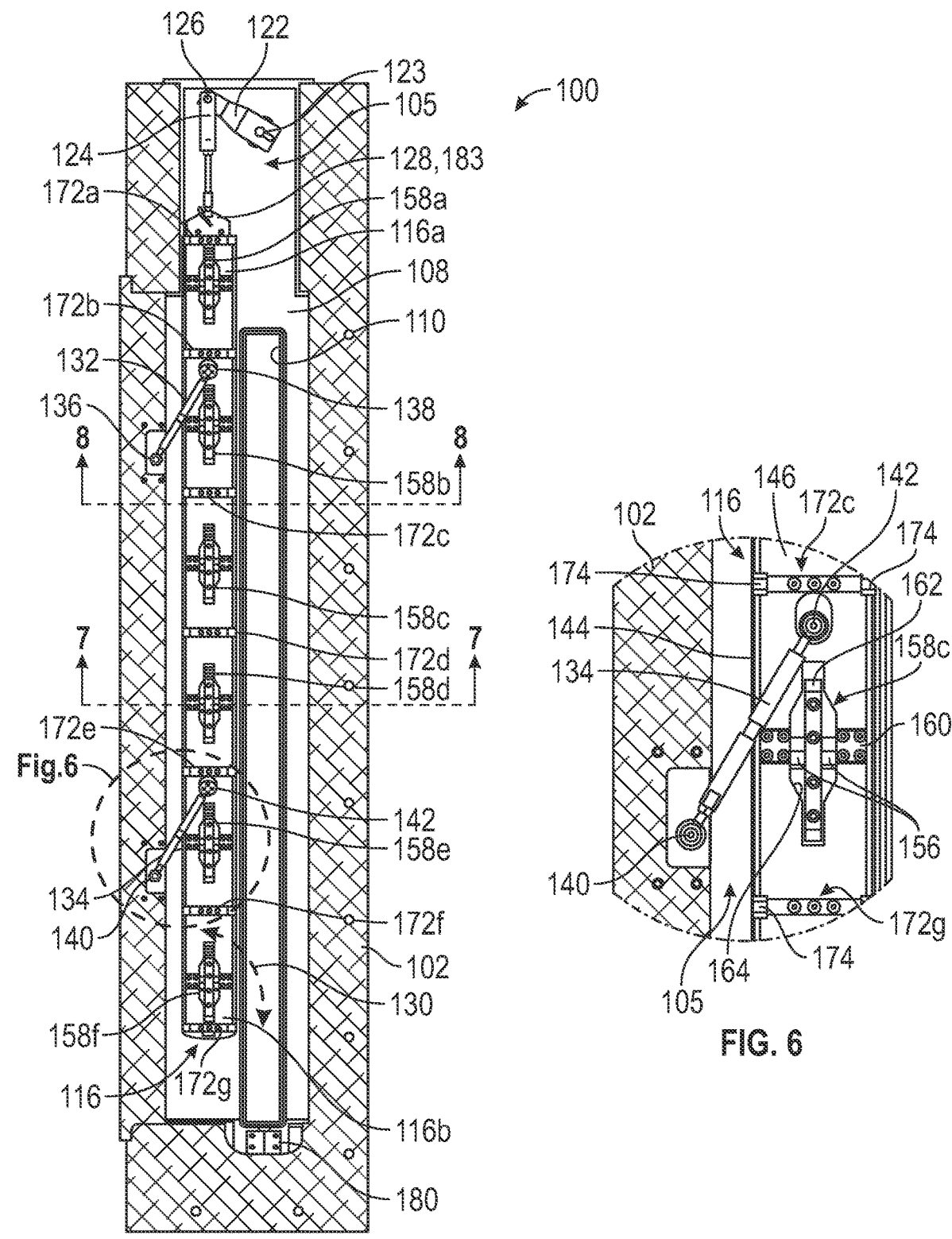

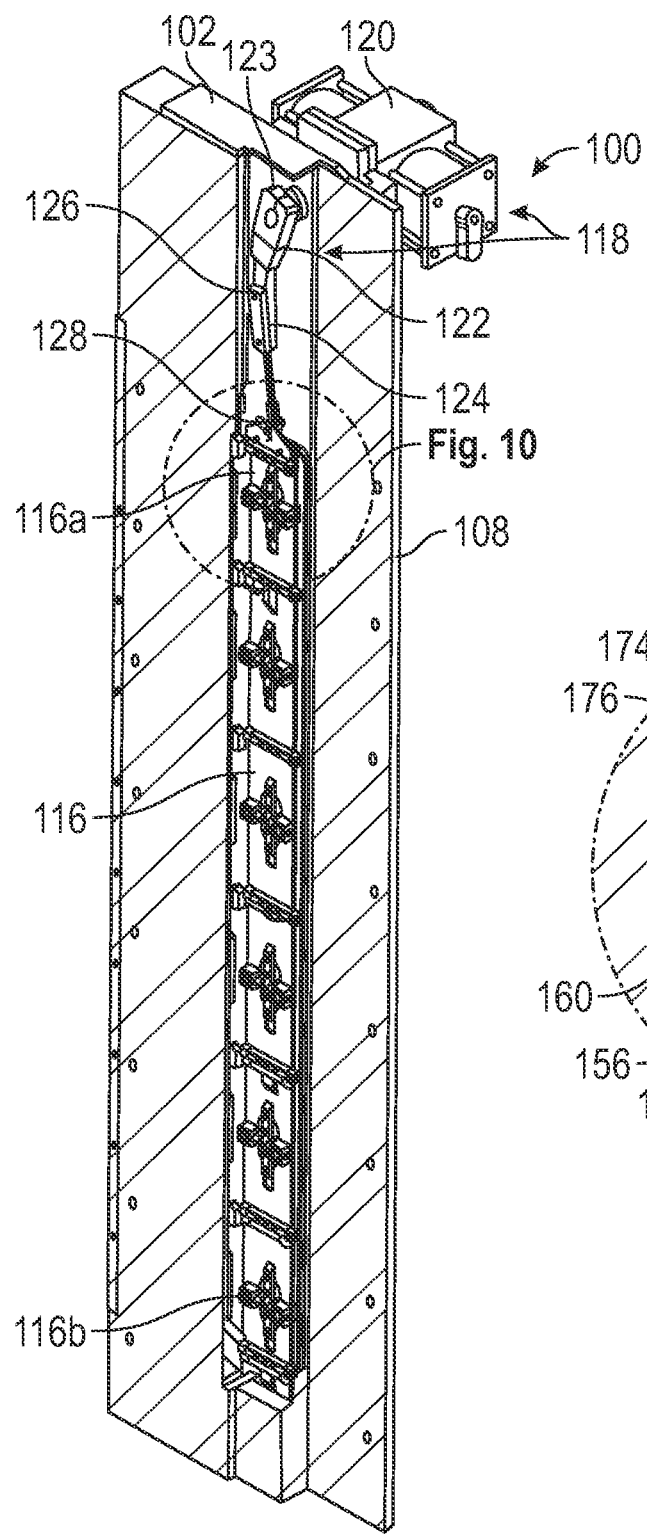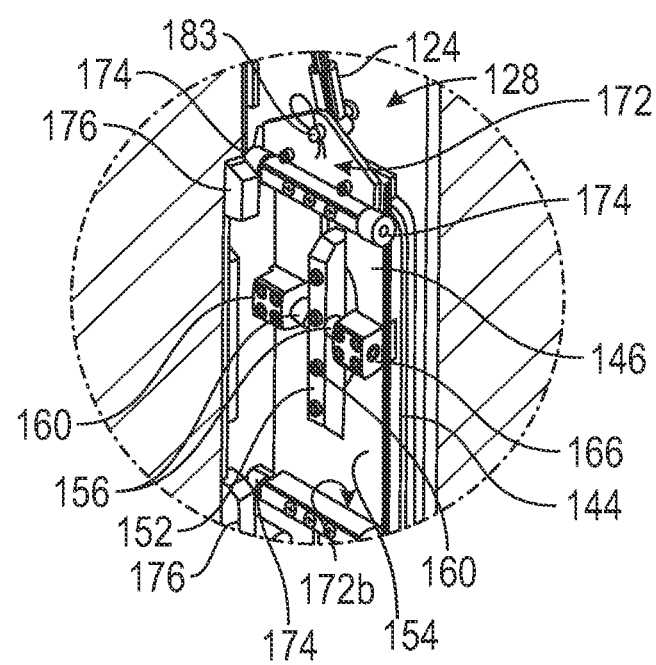
FIG. 9
FIG. 10

CHAMBER VALVE

RELATED APPLICATIONS

This application claims priority benefit of U.S. Provisional Application Ser. No. 62/151,831 filed 23 Apr. 2015; the contents of which are hereby incorporated by reference.

FIELD OF THE INVENTION

The present invention relates to rectangular valves used for isolating a vacuum chamber from atmosphere or one vacuum chamber from another. Common names for these type of vacuum valves are chamber valves, gate valves or slit valves.

BACKGROUND

Rectangular vacuum sealing valves were developed with the advent of industrial processes requiring vacuum pressures. Industries such as architectural glass, flat panel display and semiconductors all have vacuum processes. In each of these cases elongated, rectangular openings in the vacuum chambers are used to pass the substrates into vacuum and between vacuum chambers and these openings are fitted with valves to be able to easily open and close this opening. These valves have primarily taken on one of two different operating configurations: 1) like a typical house door, the valve gate swings away from the opening but in the direction of passage through the valve. And 2) like a sliding glass door, the valve gate slides open and closed perpendicular to or out of plane with the direction of passage through the valve. Examples of outward swing type rectangular valves are U.S. Pat. Nos. 4,065,097, 5,275,303 and 8,622,368. Examples of sliding type rectangular valves are U.S. Pat. No. 4,418,646, 4,721,282 and 4,903,937.

Though many variations exist and swinging and sliding rectangular valves operate satisfactorily in many applications, there remain fundamental problems with these designs. With outward swinging type rectangular valves, opening the gate takes up room in the direction substrate of passage through the valve. This is especially true for wide openings. For instance if the opening is 4", then the gate must be approximately 6" wide to incorporate the sealing O-ring. When this gate swings open, the swath required for the gate plus the hinge linkage can be 12" or more. Accommodating this swath can present challenges. For instance, when small substrates are being conveyed through the opening conveyor rolls supporting the substrates must be placed close enough together so that the substrates don't fall between the rollers. Because of the space needed to swing open the gate, complicated mechanisms can be required to raise and lower a conveyor roll to keep the conveyor roll pitch acceptable. Another problem with outward swing type rectangular gate valves is the open gate typically faces the passing substrate. Since the gate requires a seal such as an O-ring, the face of the gate cannot be heated much over 200° C. For vacuum processes requiring high temperature substrates, this is a problem. In these systems, continuous heating of the substrate is desired and any unheated zone causes the substrate temperature to drop rapidly. With outward swing type valves, heat cannot be applied near the open gate and invariably the substrate cools off as it passes by the valve.

Sliding type rectangular valves mitigate the conveyance and substrate heating problems by moving the gate sideways, out of plane with the moving substrate. With a sliding gate, even a wide gate is stowed to minimize the overall length of the valve in the travel direction. Also, the open gate—and sealing O-ring—are protected from both the substrate and from heaters close to the valve. The problem with sliding type rectangular valves is the sliding mechanism is relatively complicated and unreliable. Typically rectangular valves are narrow relative to their length. For instance, a chamber valve opening for an architectural glass vacuum coating line is on the order of 120" long by 2" wide. The gate for this valve would be 4" wide. In order to slide a gate like this sideways, multiple linear actuators and guide ways are needed so the gate doesn't cock to one side as it opens or closes. When these linear actuators must be vacuum sealed (for valves installed between two chambers both at vacuum) linear vacuum seals such as sliding lip seals or welded type bellows are used and these are prone leaking and to requiring more maintenance than rotary vacuum seals.

Therefore, an improved elongated rectangular vacuum sealing valve is needed that overcomes the problems of both outward swinging and sliding type valves. An improved valve would be compact in the substrate travel direction and keep the gate and sealing O-ring protected like a sliding valve but have a simple motion mechanism not prone to jamming and use only rotary vacuum seals like swinging valves.

SUMMARY

The elongated rectangular valve of the present invention achieves the goal of overcoming the problems of earlier valves by rotating the gate up and back out of plane with the substrate travel direction. Similar to a sliding type rectangular valve, the gate is stowed such that the gate and sealing O-ring are protected. Also like a sliding type valve, the present invention is compact minimizing the space needed for the valve in the travel direction. Similar to outward swinging type valves, the inventive rectangular valve implements rotary actuators and rotary motion to open and close the valve.

The inventive valve includes a frame extending around an elongate portal, a gate operably connected to the frame where the gate is moveable between a first position in which the gate is offset from the portal, and a second position in which the gate is aligned with the portal; a swing arm extending between the frame and the gate, a first joint at which the swing arm is rotatably connected to the frame; and a second joint at which the swing arm is rotatably connected to the gate, wherein the gate shifts laterally and diagonally relative to the portal to move between the first and second positions.

In accordance with the present invention, a chamber valve, having a frame extending around an elongate portal is provided with a gate operably connected to the frame. The gate being moveable between a first position, in which the gate is offset from the portal, and a second position in which the gate is aligned with the portal. Additionally, a swing arm extending between the frame and the gate. A first joint, at which the swing atm is rotatably connected to the frame and a second joint at which the swing atm is rotatably connected to the gate are also provided. Such that the gate shifts laterally and diagonally relative to the portal to move between the first and second positions.

In some embodiments the length of the portal is within a range from 10 to 30 times greater than a width of the portal. Further, the gate moves between the first and second positions along an arcuate path having a radius corresponding to a length of the swing arm between the first and second joints. In some embodiments, the swing arm is a first swing arm and the chamber valve further comprises a second swing arm extending between the frame and the gate. In this embodiment, a third joint, at which the second swing arm is rotatably connected to the frame, and a fourth joint at which the second swing arm is rotatably connected to the gate are provided. The fourth joint is spaced apart from the second joint in a direction parallel to a length of the gate and the length of the first swing atm between the first and second joints is equal to a length of the second swing atm between the third and fourth joints.

In some embodiments the chamber valve further comprising a drive mechanism, operably connected to the gate and configured to exert force against the gate in a direction parallel to a length of the gate to move the gate between the first and second positions. It will be seen that the drive mechanism can include a motor, a crank, and a shaft configured to transfer rotary force from the motor to the crank. The chamber valve can further comprise a rotary seal extending circumferentially around the shaft at a location along a length of the shaft at which the shaft extends through the frame. Other drive means can be utilized, such as a connecting rod extending between the crank and the gate, a first hinge at which the connecting rod is rotatably connected to the crank, and a second hinge at which the connecting rod is rotatably connected to the gate. In this way the crank rotates through a first rotational range as the gate moves from the first position to the second position, the crank rotates through a second rotational range while the gate is in the second position and rotation of the crank within the second rotational range causes the gate to seal the portal.

The invention disclosed includes a chamber valve having a first state in which the chamber valve is open, a second state in which the chamber valve is closed and unsealed, and a third state in which the chamber valve is closed and sealed. The chamber valve here comprises a frame extending around an elongate portal and a gate operably connected to the frame. The gate is moveable between a first position when the chamber valve is in the first state, and a second position when the chamber valve is in the second and third states. In such an embodiment, the gate includes a sealing plate, a spring plate parallel to the sealing plate a plurality of rockers, wherein individual rockers of the plurality of rockers are spaced apart along a length of the gate. The device includes a drive mechanism operably connected to the gate to exert force against the gate via the spring plate to move the gate along a path extending between the first and second positions. The frame includes a stop that resists further movement of the sealing plate along the path while the gate is in the second position, and the plurality of rockers transfers further force exerted against the gate by the drive mechanism via the spring plate while the gate is in the second position to the sealing plate to move the sealing plate toward the portal and away from the spring plate, thereby causing the chamber valve to transition from the second state to the third state.

In embodiments of the invention, the chamber valve further comprising a resilient sealing member extending around the portal, wherein the plurality of rockers transfers the further force to the sealing plate to compress the sealing member between the sealing plate and the frame. It will be understood that a mechanical advantage of the plurality of rockers advantageously increases as the plurality of rockers transfers the further force to the sealing plate.

In the invention, there is a vacuum-chamber system, having a first vacuum chamber shaped to contain a workpiece being processed under a first vacuum. A second vacuum chamber shaped to contain the workpiece while the workpiece is processed under a second vacuum is included with a chamber valve disposed between the first and second vacuum chambers. The chamber valve includes a portal shaped to allow movement of the workpiece between the first and second vacuum chambers and a frame that defines a peripheral volume around the portal. Further, an elongate gate, operably connected to the frame, and moveable between a first position not blocking the portal, and a second position blocking the portal, and wherein the peripheral volume is open to the first and second vacuum chambers when the gate is in the first position. A drive mechanism is operably connected to the gate to move the gate between the first and second positions. The drive mechanism is similar to that noted above. In the system of the gate shifts laterally and diagonally relative to the portal to move between the first and second positions.

Additionally, a method for operating a chamber valve is included. The method includes moving the gate laterally and diagonally relative to the portal from a first position in which the gate is offset from the portal to a second position in which the gate is aligned with the portal. Moving the gate from the first position to the second position includes rotating a first joint at which the swing arm is rotatably connected to the frame, and rotating a second joint at which the swing arm is rotatably connected to the gate; and compressing a sealing member between the gate and the frame after moving the gate from the first position to the second position.

In embodiments of the method moving the gate from the first position to the second position includes exerting force against the gate in a direction parallel to a length of the gate. In addition, exerting the force includes transferring rotary force from a motor to a crank via a shaft that extends through the frame.

BRIEF DESCRIPTION OF THE DRAWINGS

Many aspects of the present disclosure can be better understood with reference to the following drawings. The relative dimensions in the drawings may be to scale with respect to some embodiments. With respect to other embodiments, the drawings may not be to scale. For ease of reference, throughout this disclosure a reference number used in conjunction with a feature in one embodiment may also be used in conjunction with a similar or analogous feature in another embodiment.

FIGS. 1, 2 and 3 are, respectively, a front profile view, a side profile view, and a plan view of a chamber valve in accordance with an embodiment of the present technology.

FIG. 4 is a cross-sectional perspective view of the chamber valve shown in FIGS. 1-3 taken along line A-A in FIG. 3, with the chamber valve in a first state in which a gate of the chamber valve is in a first position offset from a portal of the chamber valve.

FIG. 5 is a cross-sectional front profile view of the chamber valve shown in FIGS. 1-3 taken along line A-A in FIG. 3, with the chamber valve in the first state.

FIG. 6 is an enlarged view of a portion of FIG. 5.

FIG. 9 is a cross-sectional perspective view of the chamber valve shown in FIGS. 1-3 taken along line A-A in FIG.

3, with the chamber valve in a second state in which the gate is in a second position aligned with the portal and the portal is unsealed.

FIG. 10 is an enlarged view of a portion of FIG. 9.

Figures 3, 4:
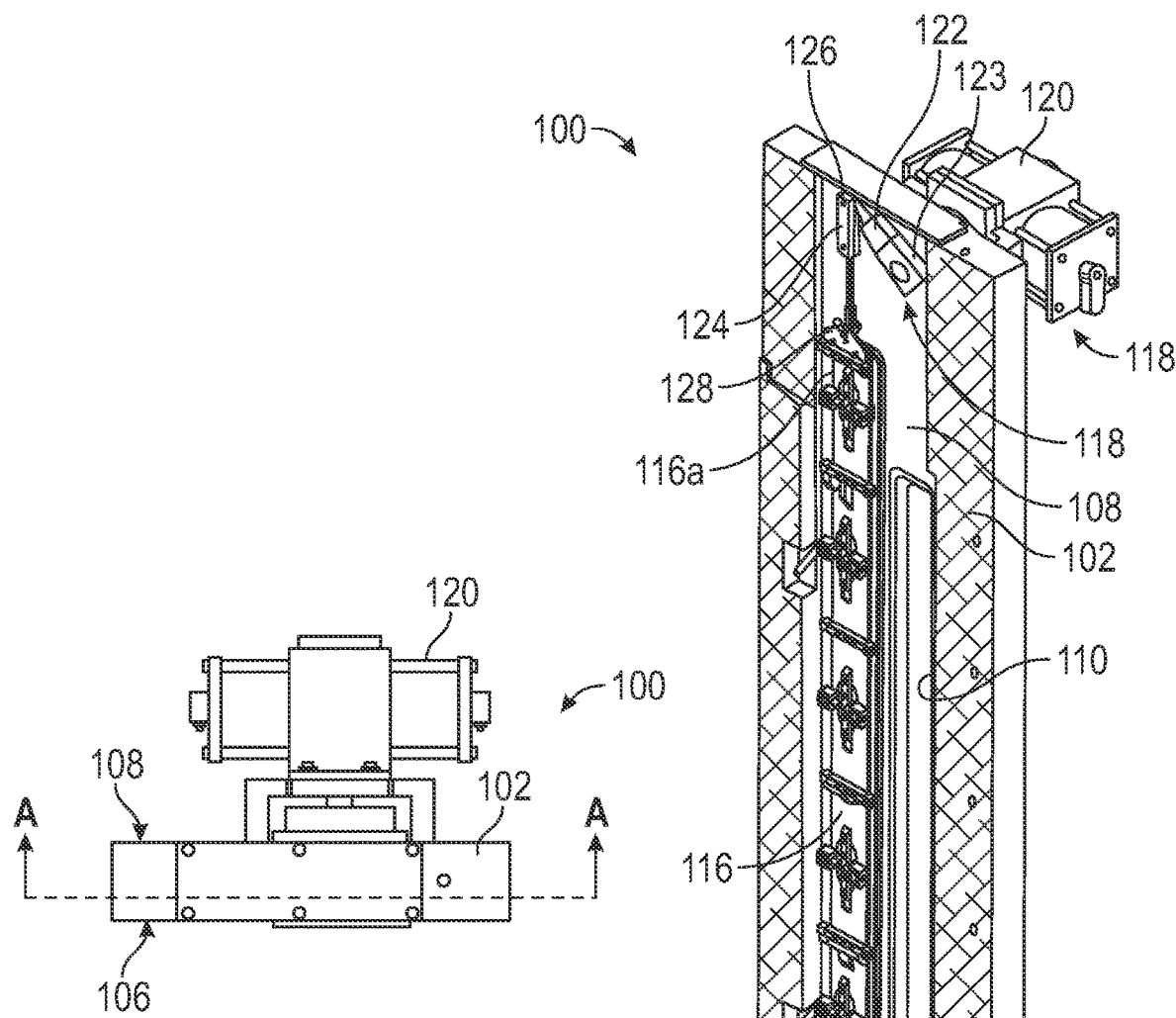
Figure 7:
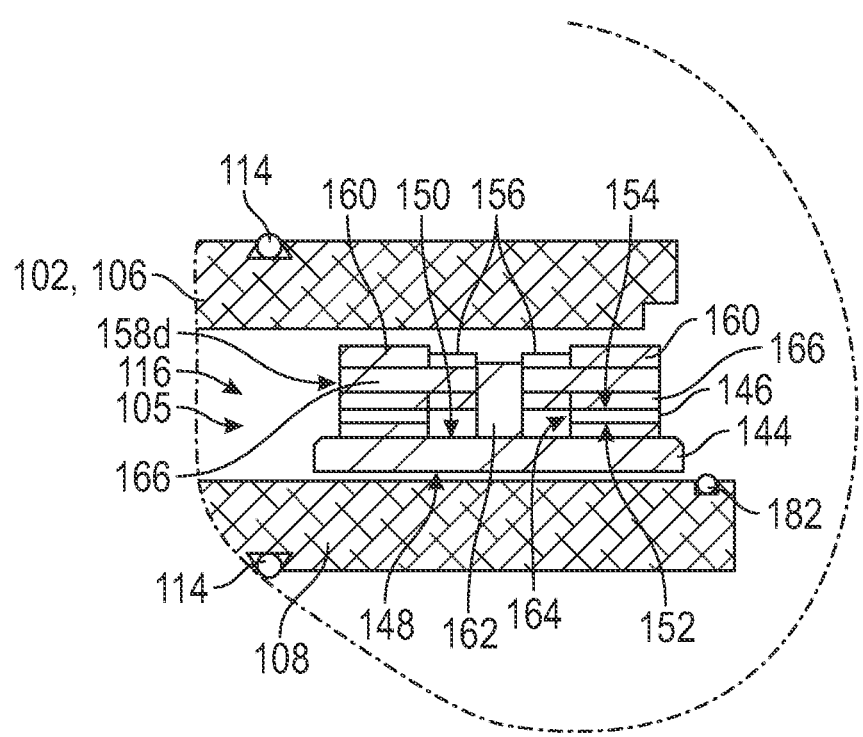
FIGS. 7 and 8 are cross-sectional partial inverse plan view of the chamber valve shown in FIGS. 1-3 taken, respectively, along lines 7-7 and 8-8 in FIG. 5, with the chamber valve in the first state.
Figure 8:
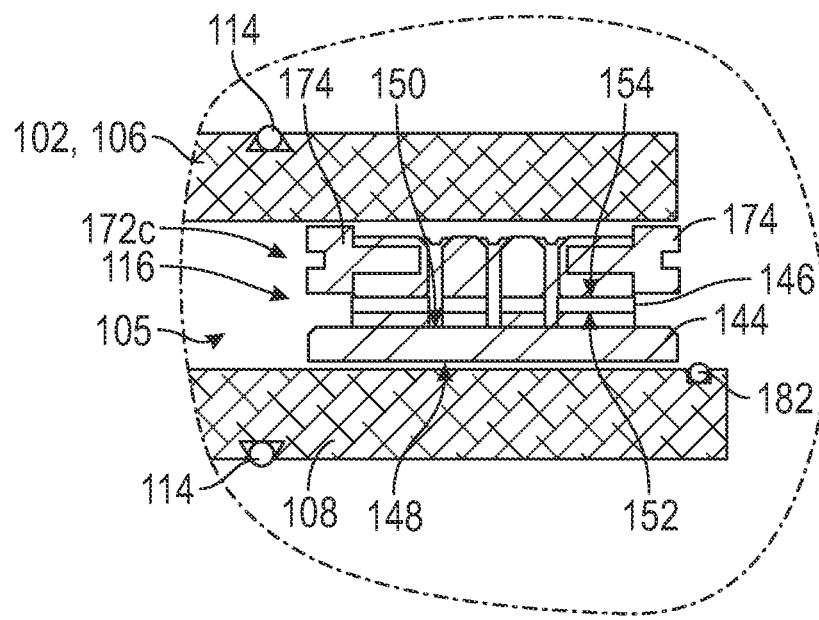
Figure 11:
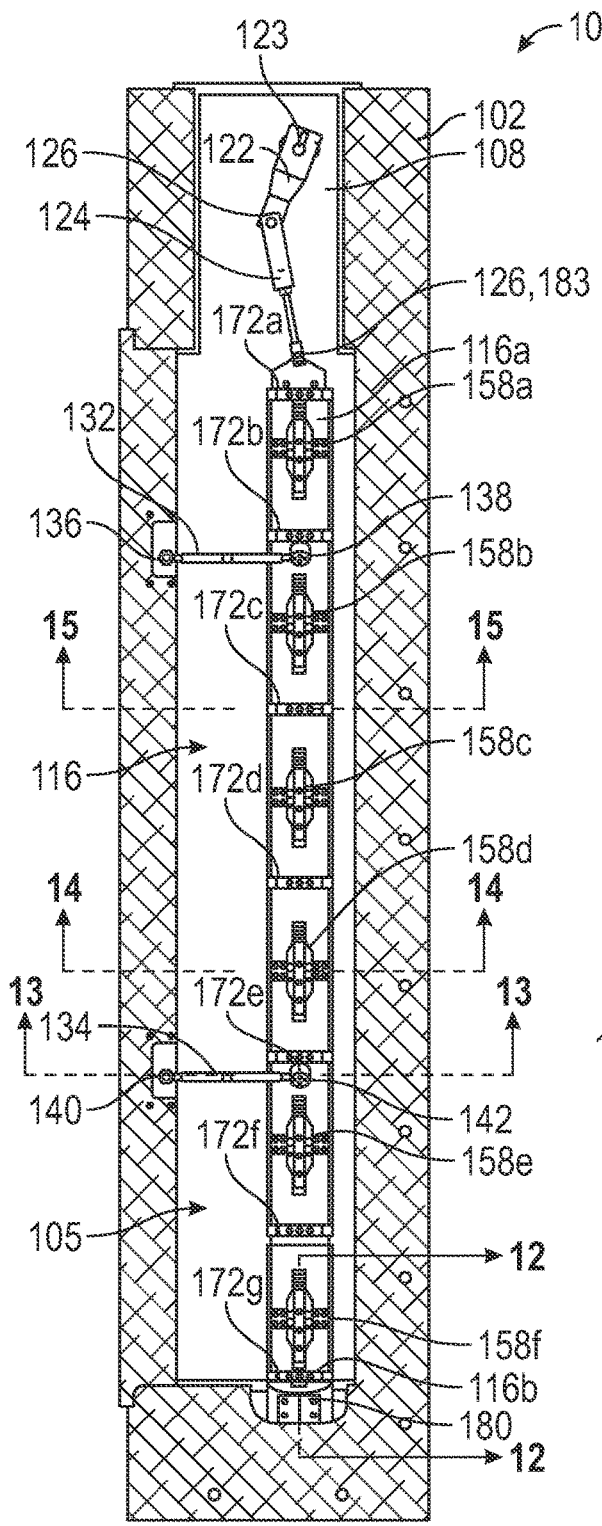

FIG. 11 is a cross-sectional front profile view of the chamber valve shown in FIGS. 1-3 taken along line A-A in FIG. 3, with the chamber valve in the second state.

Figure 12:
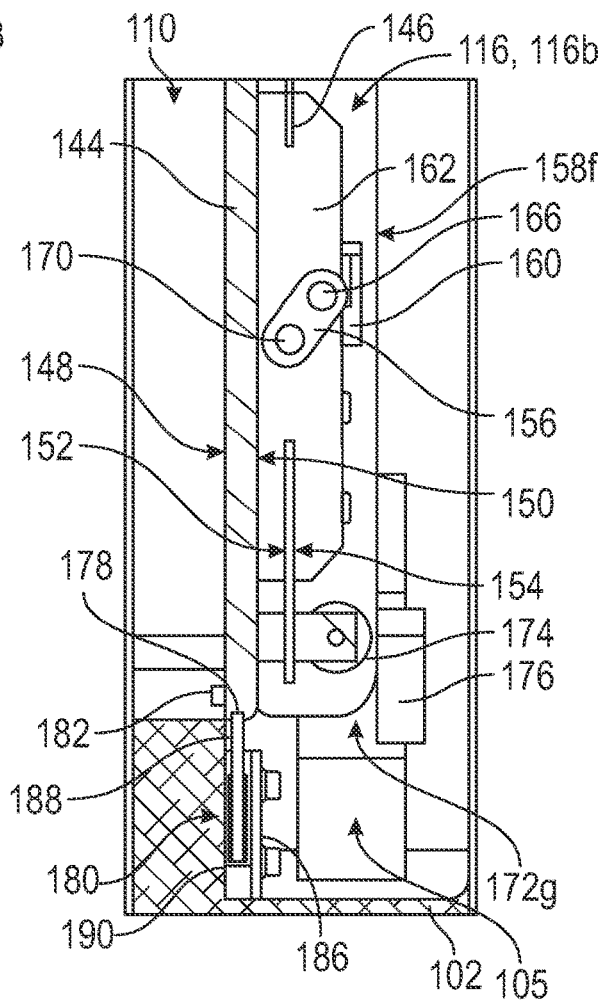

FIG. 12 is a cross-sectional partial side profile view of the chamber valve shown in FIGS. 1-3 taken along line 12-12 in FIG. 11, with the chamber valve in the second state.

Figure 13:
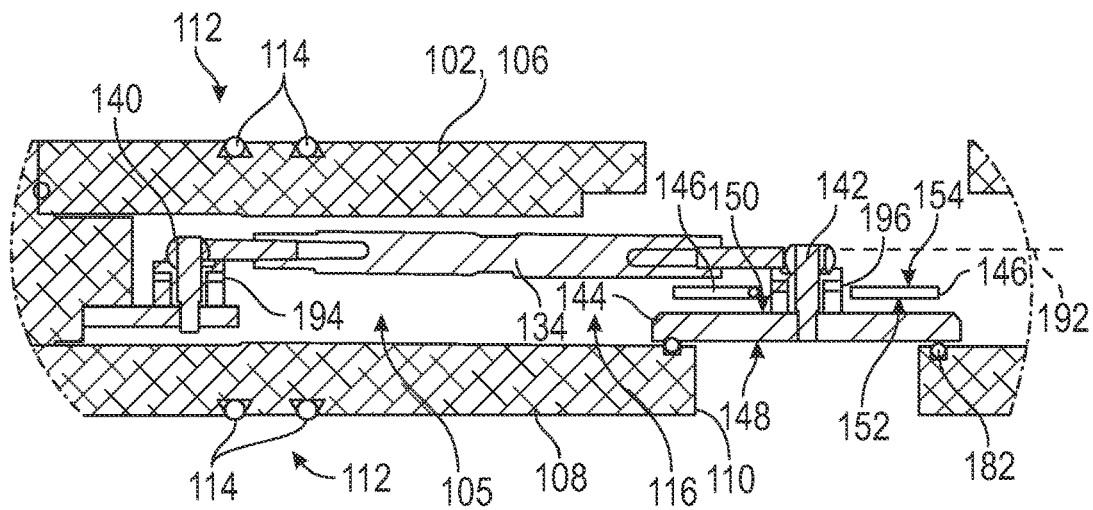
Figure 14:
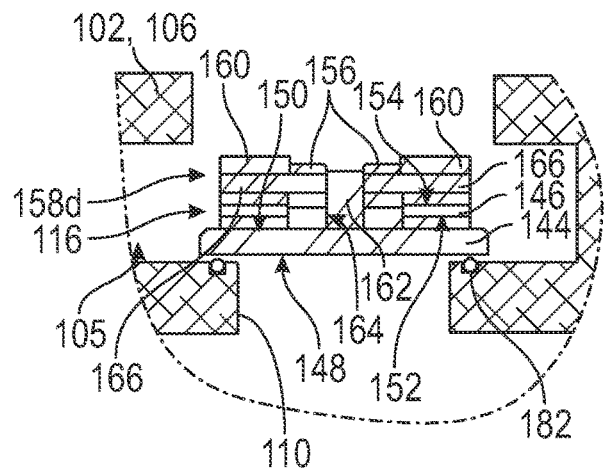
Figure 15:
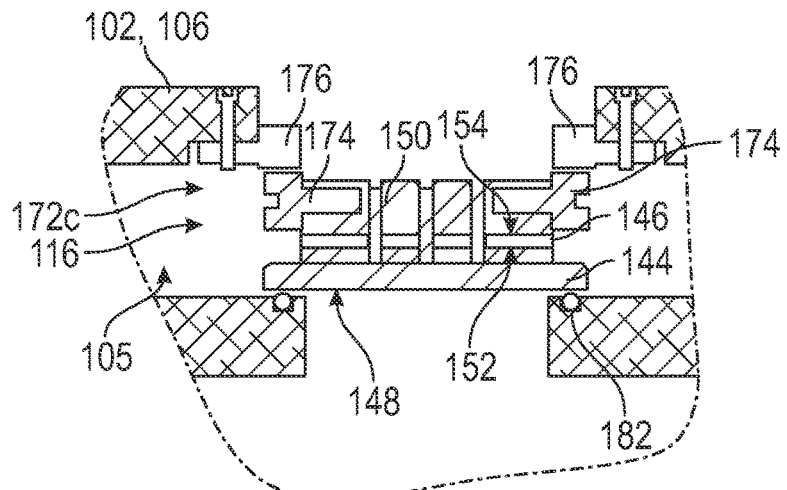

FIGS. 13, 14 and 15 are cross-sectional partial inverse plan views of the chamber valve shown in FIGS. 1-3 taken, respectively, along lines 13-13, 14-14 and 15-15 in FIG. 11, with the chamber valve in the second state.

Figure 16:
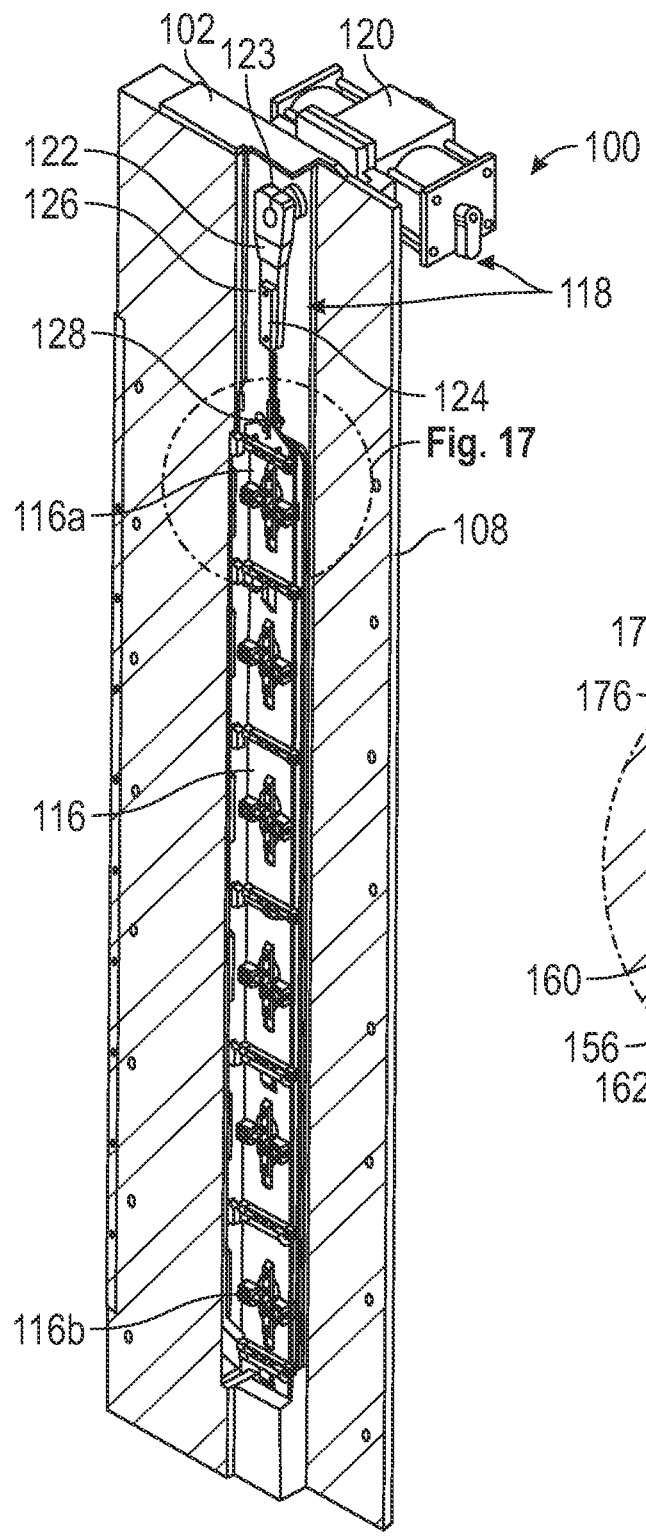

FIG. 16 is a cross-sectional perspective view of the chamber valve shown in FIGS. 1-3 taken along line A-A in FIG. 3, with the chamber valve in a third state in which the gate is in the second position and the portal is sealed.

Figure 17:
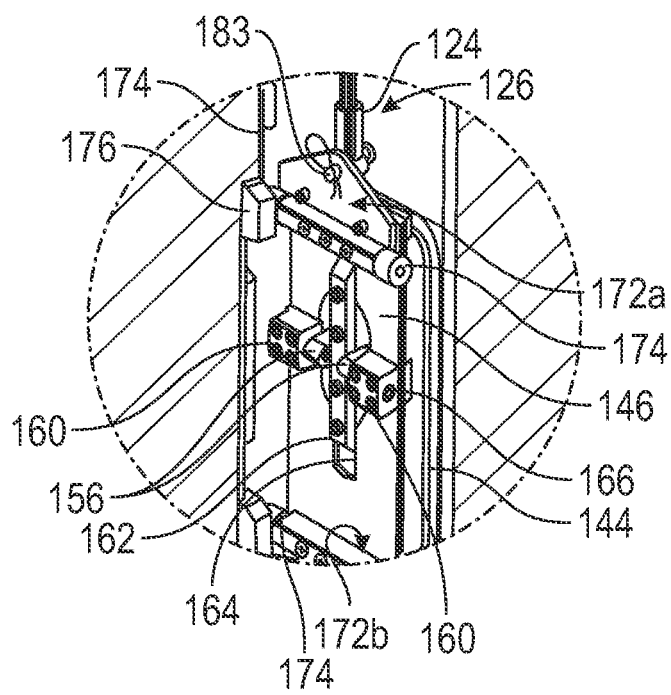

FIG. 17 is an enlarged view of a portion of FIG. 16.

Figure 18:
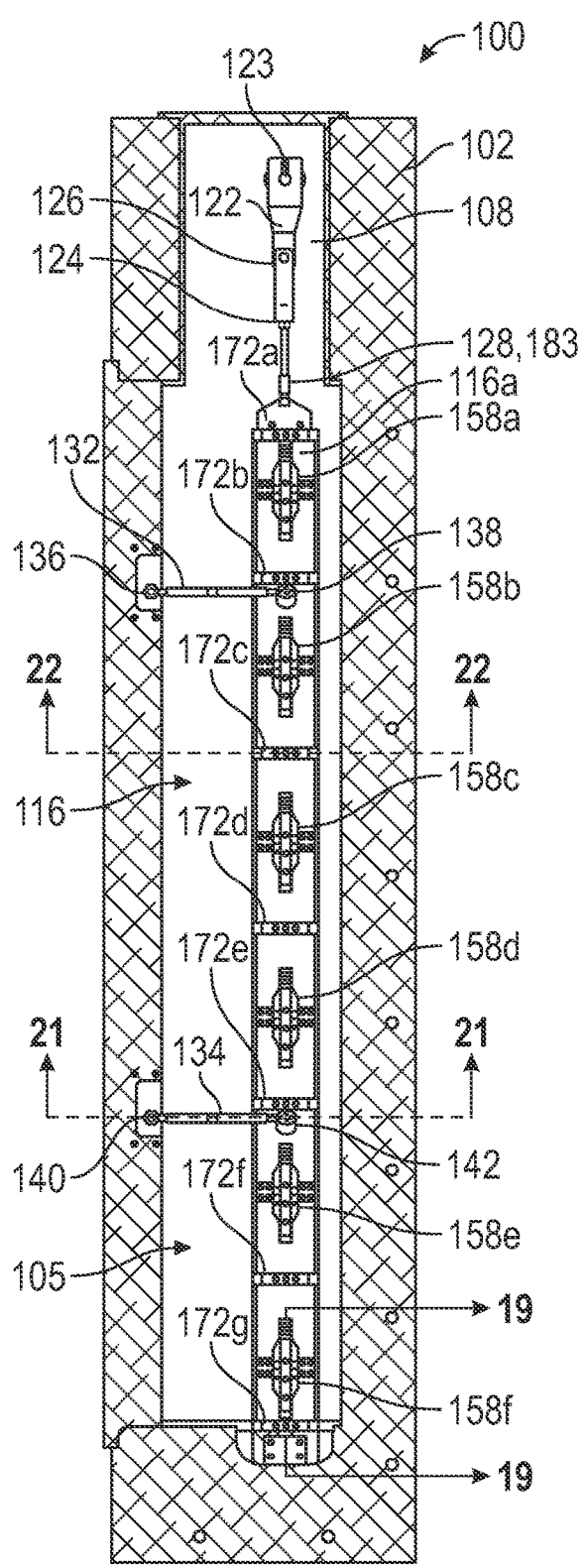

FIG. 18 is a cross-sectional front profile view of the chamber valve shown in FIGS. 1-3 taken along line A-A in FIG. 3, with the chamber valve in the third state.

Figure 19:
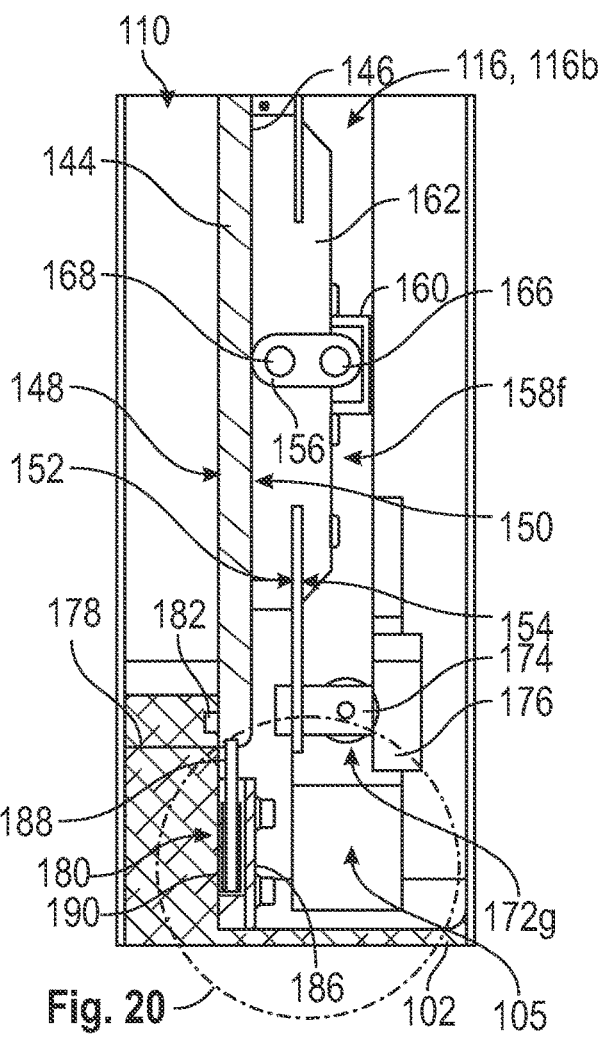

FIG. 19 is a cross-sectional partial side profile view of the chamber valve shown in FIGS. 1-3 taken along line 19-19 in FIG. 18, with the chamber valve in the second state.

Figure 20:
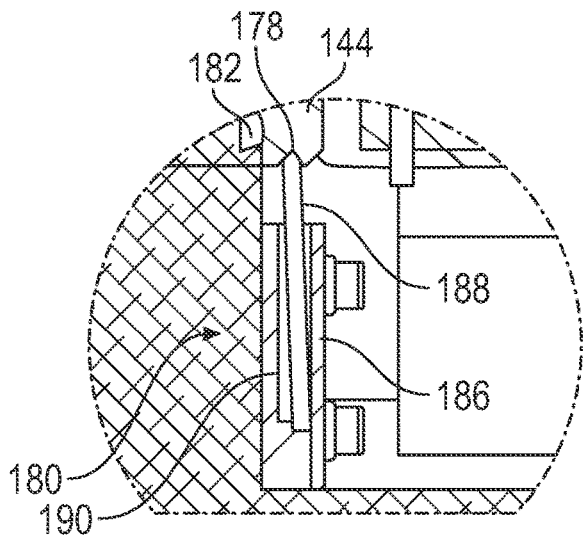

FIG. 20 is an enlarged view of a portion of FIG. 19.

Figure 21:
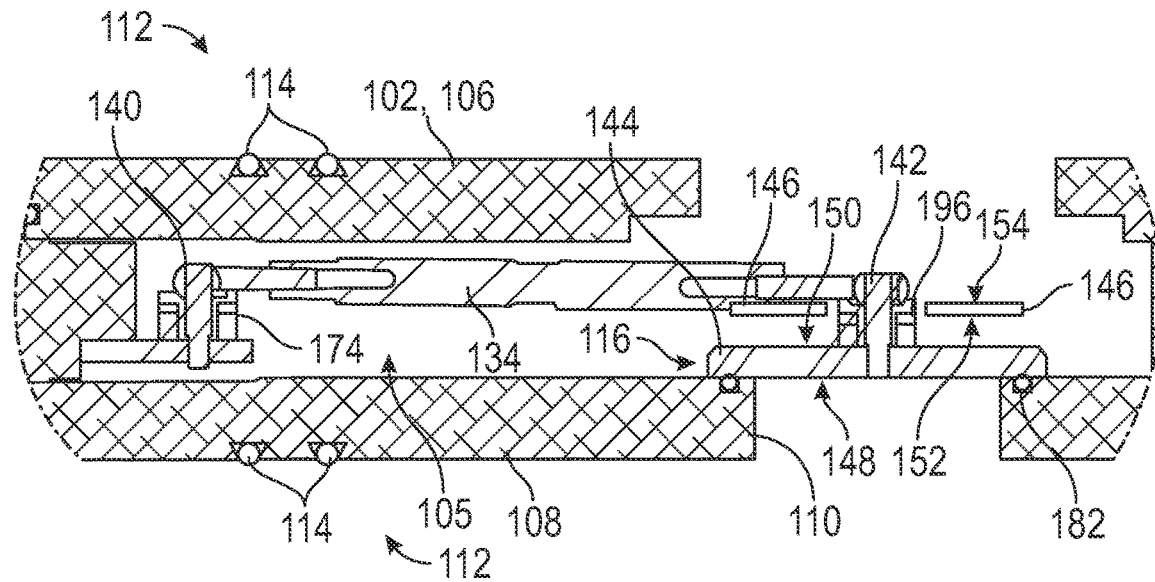
Figure 22:
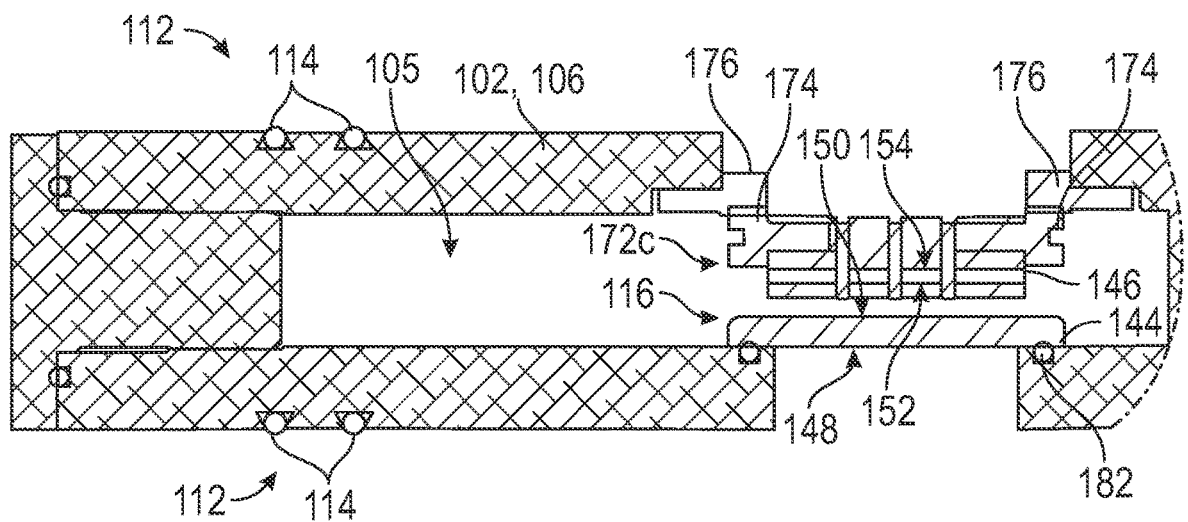

FIGS. 21 and 22 are cross-sectional partial inverse plan views of the chamber valve shown in FIGS. 1-3 taken, respectively, along lines 21-21 and 22-22 in FIG. 18, with the chamber valve in the third state.

Figure 23:
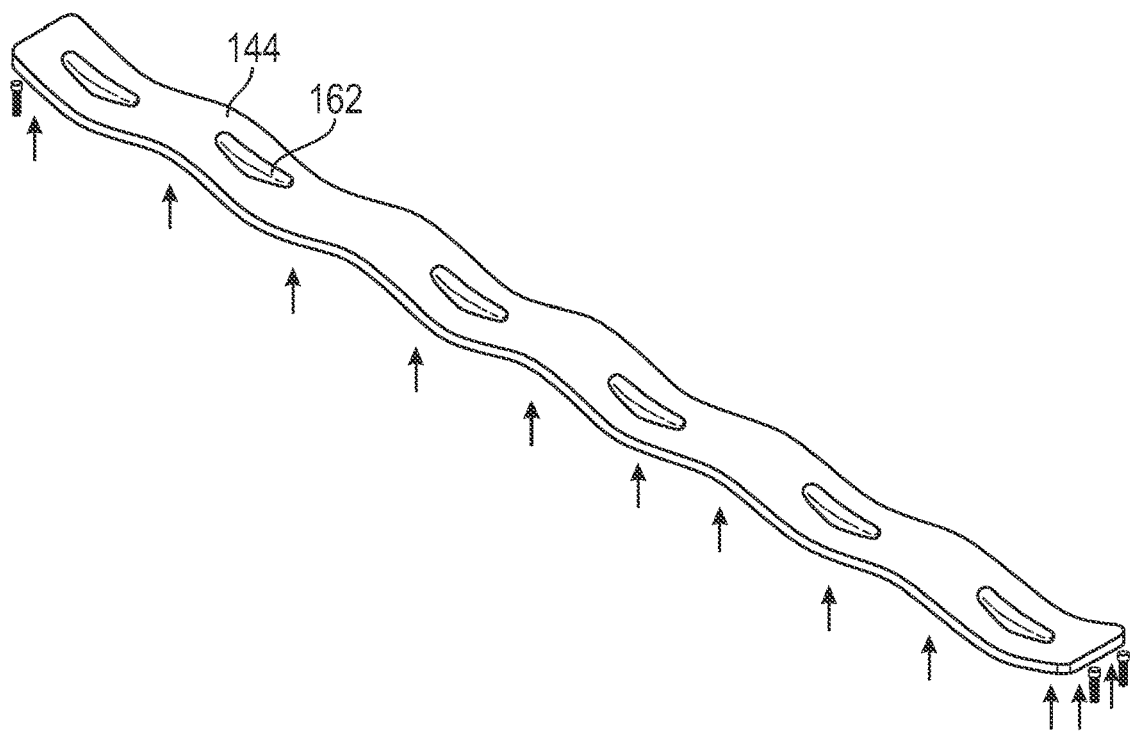

FIG. 23 is modeling diagram showing 1000-times exaggerated deflection of a sealing plate of the gate of the chamber valve shown in FIGS. 1-3 while the chamber valve is in the third state and the sealing plate is under a simulated force of 5000 lbf.

Figure 24:
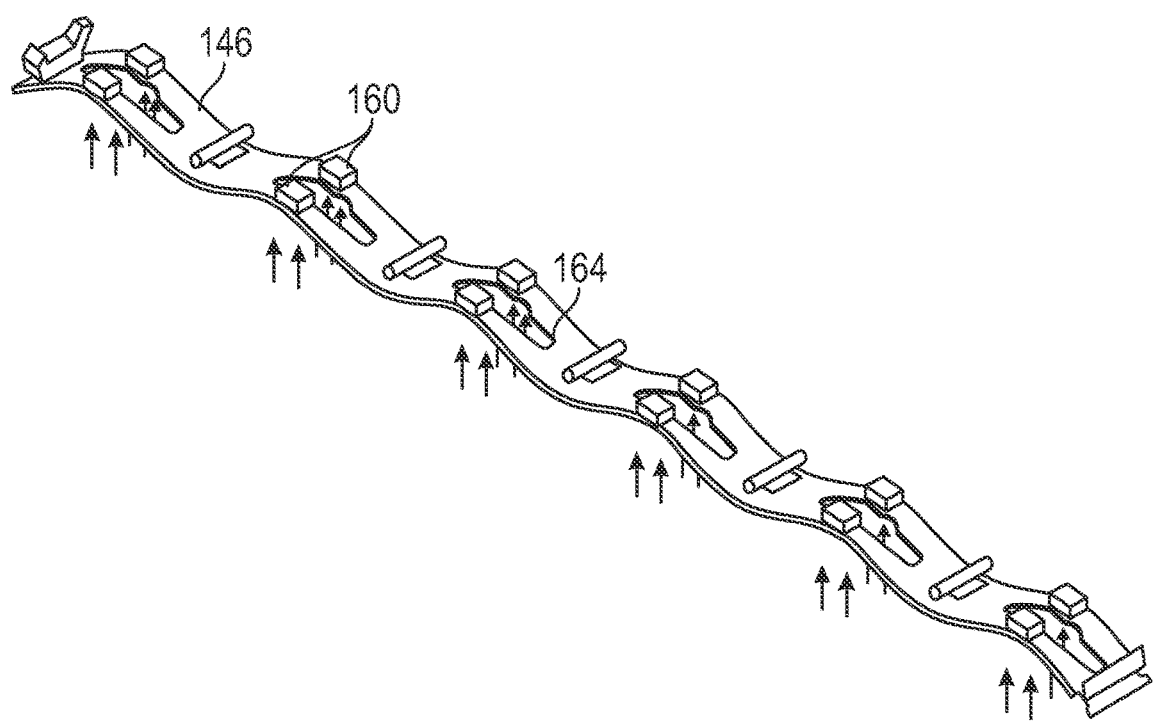

FIG. 24 is modeling diagram showing 15-times exaggerated deflection of a spring plate of the gate of the chamber valve shown in FIGS. 1-3 while the chamber valve is in the third state and the spring plate is under a simulated force of 4171 lbf.

Figure 25:
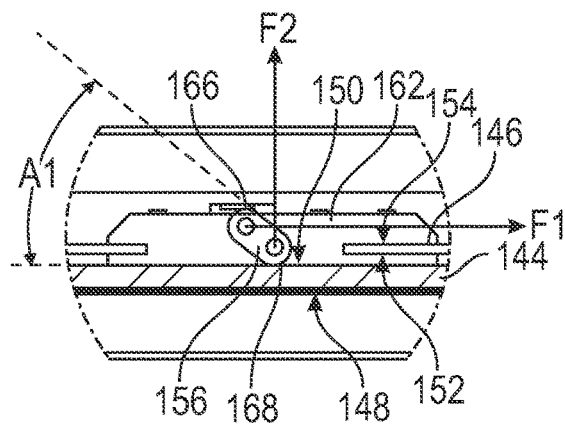

FIG. 25 is a cross-sectional partial side profile view of the chamber valve shown in FIGS. 1-3 indicating forces acting on a rocker of the gate of the chamber valve while the chamber valve transitions from the second state to the third state.

Figure 26:
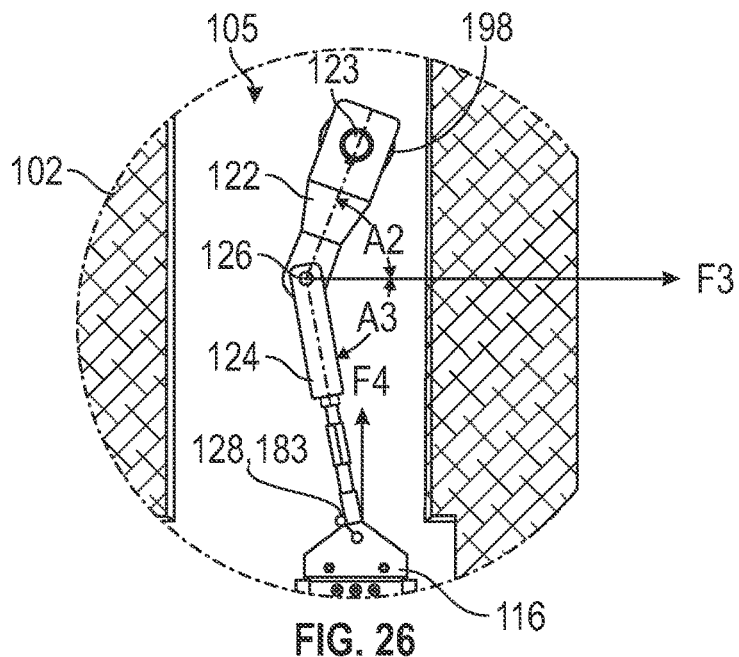
Figure 27:
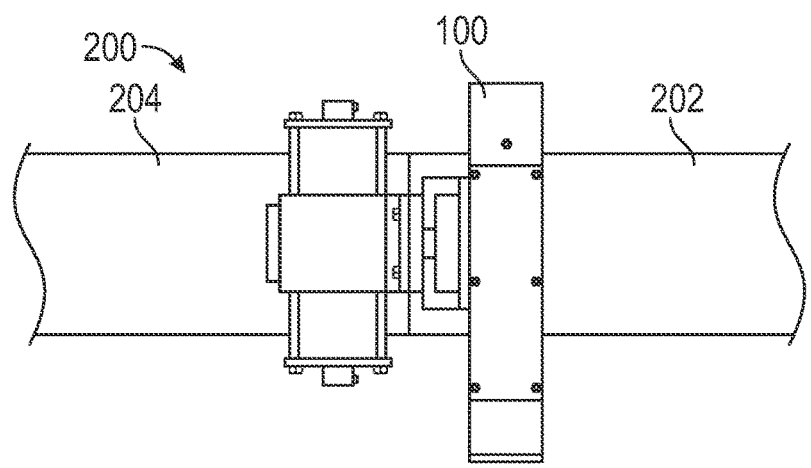

FIG. 26 is a cross-sectional partial front profile view of a portion of the chamber valve shown in FIGS. 1-3 indicating forces acting on a connecting rod of a drive mechanism of the chamber valve while the chamber valve transitions from the second state to the third state FIG. 27 is a partial plan view of a vacuum-chamber system including the chamber valve shown in FIGS. 1-3 in accordance with an embodiment of the present technology.

Figure 28:
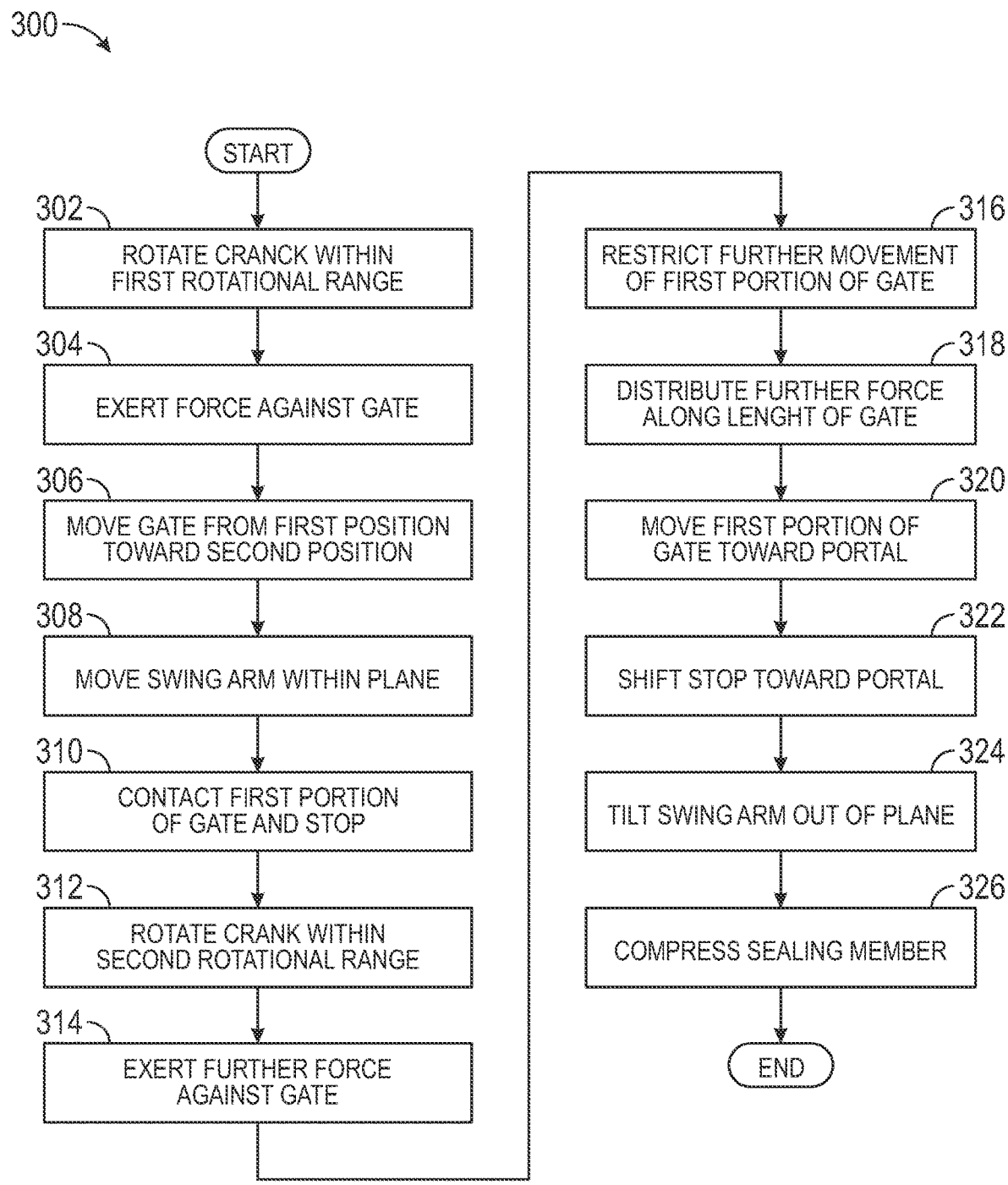

FIG. 28 is a flow chart illustrating a method for operating the chamber valve shown in FIGS. 1-3 in accordance with an embodiment of the present technology.

DETAILED DESCRIPTION

A chamber valve in accordance with a particular embodiment of the present technology includes a frame containing a portal and a gate operably associated with the portal. The gate can be configured to stow laterally and diagonally offset from the portal when the chamber valve is open. The chamber valve can include a drive mechanism having a shaft that extends through the frame. The drive mechanism can be configured to transfer a rotary force into the frame via the shaft, and to convert the force within the frame into a linear force that is then applied against the gate. The chamber valve can include a rotary seal extending circumferentially around the shaft. In response to the applied force, the gate can move into alignment with the portal while remaining within a plane parallel or nearly parallel to the portal. The gate can include a sealing plate and a mechanism that moves the sealing plate out of the plane toward the portal after the gate becomes aligned with the portal. For example, after the gate becomes aligned with the portal, the mechanism can switch the applied force from moving the gate into alignment with the portal to moving the sealing plate toward the portal and thereby sealing the portal. The mechanism can distribute the applied force over a length of the sealing plate to compress a sealing member between the gate and the frame.

The chamber valve may be more compact than at least some conventional counterparts. This attribute may be associated with the gate being configured to move laterally relative to the portal rather than to swing outwardly from the portal. Because the chamber valve need not accommodate swinging of the gate outwardly from the portal, a distance between an entrance at one side of the chamber valve and an exit at an opposite side of the chamber valve may be relatively small (e.g., less than 6 inches), even when a width of the gate is relatively large (e.g., greater than 4 inches). Among other potential advantages, this compactness of the chamber valve may reduce or eliminate undesirable thermal fluctuations that would otherwise occur as workpieces move through the chamber valve. For example, a workpiece may move from a first high-temperature process carried out within a chamber at the entrance of the chamber valve, through an unheated area within the chamber valve, to another high-temperature process carried out within a chamber at the exit of the chamber valve without experiencing undue cooling.

In addition to being relatively compact, the chamber valve may be more reliable than at least some conventional counterparts. In at least some cases, this attribute is associated with the chamber valve being configured to transfer force through the frame as rotary force rather than linear force. This rotary seal is expected to be more reliable than a linear seal when the peripheral volume is maintained at a vacuum pressure. Furthermore, the reliability of the chamber valve may be associated with the configuration of the chamber valve to use the same force for both moving the gate into alignment with the portal and moving the sealing plate toward the portal to seal the portal. This configuration, for example, may reduce or eliminate the need for challenging synchronization of multiple actuators. Other potential advantageous of embodiments of the present technology in addition to or instead of the foregoing advantages will be apparent from the following description of embodiments of the present technology.

Specific details of systems, devices, and methods in accordance with several embodiments of the present technology are disclosed herein with reference to FIGS. 1-29. Although systems, devices, and methods may be disclosed herein primarily or entirely with respect to vacuum-processing applications, other applications in addition to those disclosed herein are within the scope of the present technology. Furthermore, it should understood, in general, that systems, devices, and methods in addition to those disclosed herein are within the scope of the present technology. For example, systems, devices, and methods in accordance with embodiments of the present technology can have different and/or additional configurations, components, and/or procedures than those described herein. Moreover, a person of ordinary skill in the art will understand that systems, devices, and methods in accordance with embodiments of the present technology can be without the configurations, components, and/or procedures described herein without deviating from the present technology.

FIGS. 1, 2 and 3 are, respectively, a front profile view, a side profile view, and a plan view of a chamber valve 100 in accordance with an embodiment of the present technology. FIG. 4 is a cross-sectional perspective view of the chamber valve 100 taken along line A-A in FIG. 3. With reference to FIGS. 1-4 together, the chamber valve 100 can include a frame 102 that extends around a sealable portal 110. The portal 110 can be configured for ingress/egress of workpieces through the chamber valve 100. Around the portal 110, the frame 102 can define a peripheral volume 105. In some embodiments, the chamber valve 100 includes a front panel 106 and a back panel 108 spaced apart at opposite sides of the peripheral volume 105. For example, the frame 102 can be configured to form a barrier (e.g., a gas-impermeable barrier) around the peripheral volume 105.

As shown in FIG. 4, the portal 110 can be elongate. For example, a length of the portal 110 can be from 2 times to 65 times (e.g., from 10 times to 30 times) a width of the portal 110. In at least some embodiments, the width of the portal is at least 2 inches, such as within a range from 2 inches to 6 inches. The portal 110 can have these or other suitable dimensions and have the form of a slit or a slot. This form can be useful, for example, to accommodate movement of large-area workpieces (e.g., sheets of glass or other substrates) through the chamber valve 100. When the chamber valve 100 is used within a vacuum-chamber system, workpieces can travel through the chamber valve 100 from a chamber (not shown) adjacent to the front panel 106 to another chamber (not shown) adjacent to the back panel 108. The frame 102 can be configured to be oriented such that the length of the portal 110 is vertical. Alternatively, the frame 102 can be configured to be oriented such that the length of the portal 110 is horizontal. In other embodiments, corresponding portals and frames can have other suitable shapes, forms, and/or orientations.

With reference again to FIGS. 1-4, at one or both of the front and back panels 106, 108, the chamber valve 100 can include an outwardly facing sealing member 112. In the illustrated embodiment, the chamber valve 100 includes outwardly facing sealing members 112 at both of the front and back panels 106, 108, respectively, with each of these outwardly facing sealing members 112 including a pair of concentric, outwardly facing o-rings 114. The chamber valve 100 can be configured to be sealingly engaged, via the outwardly facing sealing members 112, with a first chamber (not shown) at the front panel 106 and with a second chamber (also not shown) at the back panel 108. Accordingly, the chamber valve 100 can be suitable for use as an internal valve that selectively opens and closes a connection between neighboring chambers in a multiple-chamber processing system. Alternatively or in addition, the chamber valve 100 can be configured to be sealingly engaged with a chamber (not shown) at one of the front and back panels 106, 108 while the other of the front and back panels 106, 108 is not sealingly engaged with a chamber. For example, the chamber valve 100 can be suitable for use as an external valve to open an entry into or to close an exit from a single-chamber or multiple-chamber processing system.

The chamber valve 100 can include a gate 116 operably connected to the frame 102. The gate 116 can be elongate with a first end portion 116a and an opposite second end portion 116b. In at least some embodiments, the gate 116 has a width greater than 4 inches, such as within a range from 4 inches to 8 inches. Based on a position of the gate 116 relative to the portal 110, the chamber valve 100 can be in or between one of three states at any given time. In FIGS. 1-4, the gate 116 is shown in a first position where it does not block the portal 110 (e.g., is offset from the portal 110) such that the chamber valve 100 is in a first state (also referred to herein as an "open state") in which workpieces can pass through the chamber valve 100. The gate 116 is movable from the first position to a second position (not shown in FIGS. 1-4) in which the gate 116 blocks the portal 110 (e.g., is aligned with the portal 110) such that the chamber valve 100 transitions from the first state to a second state (also referred to herein as a "closed and unsealed state") in which movement of workpieces through the chamber valve 100 is obstructed, but the portal 110 is unsealed. The gate 116 can be actuatable while in the second position to seal the portal 110 and thereby cause the chamber valve 100 to transition from the second state to a third state (also referred to herein as a "closed and sealed state") in which movement of workpieces through the chamber valve 100 is obstructed and the portal 110 is sealed.

As shown in FIG. 4, the chamber valve 100 can include a drive mechanism 118 operably connected to the gate 116. The drive mechanism 118 can include a motor 120 outside the peripheral volume 105, a crank 122 within the peripheral volume 105, and a shaft 123 extending between the motor 120 and the crank 122. The motor 120 can be a pneumatic motor (as show), a stepper motor (e.g., with a worm gear reducer), or have another suitable form. In at least some cases, use of a servo motor (e.g., an electric servo motor) or another type of non-pneumatic motor is preferable to use of a pneumatic motor to reduce or eliminate performance variations causes by the compressibility of air. The drive mechanism 118 can further include a connecting rod 124 extending between the crank 122 and the gate 116, a first hinge 126 at which the connecting rod 124 is rotatably coupled to the crank 122, and a second hinge 128 at which the connecting rod 124 is rotatably coupled to the gate 116. The drive mechanism 118 can be configured both to move the gate 116 between the first and second positions and to actuate the gate 116 to seal the portal 110. Thus, the drive mechanism 118 can provide a single, compact source of motive force for transitioning the chamber valve 100 between the first, second, and third states. FIGS. 5-8 are various cross-sectional views that further illustrate features of the chamber valve 100 in the first state. FIGS. 9-15 are various cross-sectional views that further illustrate features of the chamber valve 100 in the second state. FIGS. 16-22 are various cross-sectional views that further illustrate features of the chamber valve 100 in the third state.

With reference to FIGS. 5-22 together, the drive mechanism 118 can be configured to exert force against the gate 116 in a direction parallel to the length of the gate 116 to move the gate 116 along a path 130 (FIG. 5) extending between the first and second positions. In the illustrated embodiment, the chamber valve 100 includes a first swing arm 132 and a second swing arm 134 that guide movement of the gate 116 along the path 130. The first and second swing arms 132, 134 can extend between the frame 102 and the gate 116 at respective positions spaced apart in a direction parallel to the length of the gate 116. The chamber valve 100 can further include a first joint 136 at which the first swing arm 132 is rotatably coupled to the frame 102, and a second joint 138 at which the first swing arm 132 is rotatably coupled to the gate 116. Similarly, the chamber valve 100 can include a third joint 140 at which the second swing arm 134 is rotatably coupled to the frame 102, and a fourth joint 142 at which the second swing arm 134 is rotatably coupled to the gate 116. In other embodiments, a corresponding chamber valve can have greater than two swing arms. For example, three or more swing anus can be useful to support relatively long and narrow gates.

In at least some embodiments, the gate 116 shifts laterally and diagonally relative to the portal 110 to move between the first and second positions. For example, the gate 116 can move between the first and second positions along the path 130 while remaining parallel or nearly parallel with the plane of the portal 110. As the gate 116 moves between the first and second positions, the first and second swing arms 132, 134 can move within a plane to guide the movement of the gate 116. For example, the path 130 between the first and second positions can be arcuate and have a radius that corresponds to a length of the first swing arm 132 between the first and second joints 136, 138. The length of the second swing arm 134 between the third and fourth joints 140, 142 can be equal to the length of the first swing arm 132 between the first and second joints 136, 138. Thus, the radius of the path 130 between the first and second positions can also correspond to the length of the second swing arm 134 between the third and fourth joints 140, 142.

The gate 116 can include multiple components movably connected to one another. These components can be configured to work together and/or with other components of the chamber valve 100 to cause the chamber valve 100 to transition between the second and third states while the gate 116 is in the second position. Among these components, the gate 116 can include a sealing plate 144 and a spring plate 146 movably connected to one another. The sealing plate 144 can have a first major surface 148 and an opposite second major surface 150. The first major surface 148 of the sealing plate 144 can face toward the portal 110 when the gate 116 is in the second position. The spring plate 146 can be parallel or nearly parallel to the sealing plate 144 and further from the portal 110 than the sealing plate 144 when the gate 116 is in the second position. Similar to the sealing plate 144, the spring plate 146 can have a first major surface 152 and an opposite second major surface 154. The first major surface 152 of the spring plate 146 can be closer to the sealing plate 144 than the second major surface 154 of the spring plate 146 when the gate 116 is in the second position.

The gate 116 can further include rockers 156 (FIG. 6) extending through a space between the sealing plate 144 and the spring plate 146. The rockers 156 can be configured to transfer force exerted against the gate 116 by the drive mechanism 118 to the sealing plate 144 while the gate 116 is in the second position to move the sealing plate 144 toward the portal 110 and away from the spring plate 146. In at least some cases, the rockers 156 are configured to distribute this force along the length of the gate 116. For example, the rockers 156 can be spaced apart in pairs along the length of the gate 116 such that individual pairs of the rockers 156 transfer force to the gate 116 at spaced apart positions along the length of the gate 116. The gate 116 can include a plurality of pushing mechanisms 158 (individually identified as pushing mechanisms 158a-158f in FIG. 5) at spaced apart positions along the length of the gate 116. The individual pairs of rockers 156 can be respectively associated with the pushing mechanisms 158a-158f.

The pushing mechanism 158a and associated components of the chamber valve 100 are now further described with reference to FIG. 10 with the understanding that the other pushing mechanisms 158b-158f and associated components of the chamber valve 100 can have the same or similar configurations. As shown in FIG. 10, the pushing mechanism 158a can include a pair of blocks 160 fixedly connected to the spring plate 146, and a rib 162 fixedly connected to the sealing plate 144. The blocks 160 can protrude from the second major surface 154 of the spring plate 146. Similarly, the rib 162 can protrude from the second major surface 150 of the sealing plate 144. The spring plate 146 can include a longitudinal slot 164 between the blocks 160. One of the rockers 156 can extend through the slot 164 between the rib 162 and one of the blocks 160. Another of the rockers 156 can extend through the slot 164 between the rib 162 and the other of the blocks 160. The pushing mechanism 158a can further include first axles 166 rotatably connecting the rockers 156 to the blocks 160, respectively, and a second axle 170 (shown in FIG. 12 for the pushing mechanism 158f) rotatably connecting the both of the rockers 156 to the rib 162.

With reference to FIGS. 9 and 10 together, the gate 116 can include a plurality of support beams 172 (individually identified as beams 172a-172g) protruding from the second major surface 154 of the spring plate 146 at respective positions interspersed between respective positions of the pushing mechanisms 158a-158f along the length of the gate 116. The beam 172a and associated components of the chamber valve 100 are now further described with reference to FIG. 10 with the understanding that the other beams 172a-172g and associated components of the chamber valve 100 can have the same or similar configurations. The beam 172a can extend along a width of the gate 116 from one side of the gate 116 to an opposite side of the gate 116. The beam 172a can include bearings 174 that protrude from the respective sides of the gate 116. In the illustrated embodiment, the bearings 174 are rollers. In other embodiments, corresponding bearings can be sliders, blocks, or have other suitable faints. With reference again to FIGS. 9 and 10, the frame 102 can include tabs 176 (partially shown in FIG. 9) that become aligned with the individual bearings 174, respectively, when the gate 116 is in the second position. As the chamber valve 100 transitions from the second state to the third state, the bearings 174 can move into contact with the tabs 176 and move downward along respective surfaces of the tabs 176 while the tabs 176 restrict movement of the spring plate 146 away from the portal 110. In a particular embodiment, the bearings 174 move about 1.5 mm toward the tabs 176 as the chamber valve 100 transitions from the second state to the third state. In other embodiments, the bearings 174 can move other suitable distances or contact the tabs 176 before the chamber valve 100 reaches the second state.

With reference now to FIG. 12, the sealing plate 144 can include a downwardly facing groove 178 at the second end portion of the gate 116. The frame 102 can include a stop 180 having an upper edge positioned to be received within the groove 178 when the gate 116 is in the second position. After the gate 116 moves along the path 130 from the first position to the second position, the stop 180 can engage the sealing plate 144 at the groove 178 and resist further movement of the sealing plate 144 along the path 130. While in contact with the stop 180, the sealing plate 144 can be aligned with the portal 110. The chamber valve 100 can include a resilient, inwardly facing sealing member 182 (e.g., an o-ring) extending around the portal 110. When the sealing plate 144 first moves into contact with the stop 180, a peripheral portion of the sealing plate 144 can be staged to engage the inwardly facing sealing member 182 as the chamber valve 100 transitions from the second state to the third state.

The second hinge 126 can include a pin 183 at which the connecting rod 124 is rotatably coupled to the spring plate 146. The drive mechanism 118 can be configured to transfer force to the gate 116 via the pin 183 and the spring plate 146 in a direction parallel to the length of the gate 116. While the gate 116 moves between the first and second positions, gravity acting on the sealing plate 144 can cause the rockers 156a-156l to tilt downward toward the sealing plate 144 such that a distance between the sealing plate 144 and the spring plate 146 is relatively small. While the gate 116 is in the second position, further force transferred to the gate 116 by the drive mechanism 118 via the pin 183 and the spring plate 146 in the direction parallel to the length of the gate 116 can cause the rockers 156a-156l to tilt upward toward the sealing plate 144 such that the distance between the sealing plate 144 and the spring plate 146 increases. As shown in FIGS. 12 and 13, when the gate 116 is in the second position, the stop 180 can restrict downward movement of the sealing plate 144 and the tabs 176 can resist movement of the spring plate 146 away from the portal 110. The further force, therefore, is directed to moving the sealing plate 144 toward the portal 110 and away from the spring plate 146 to compress the inwardly facing sealing member 182. Due, at least in part, to the distribution of the rockers 156a-156l, the transferred force can be applied in a distributed manner such that the inwardly facing sealing member 182 is compressed uniformly.

With further reference to FIGS. 12 and 19, the stop 180 can have a starting position (FIG. 12) when out of contact with the sealing plate 144 and when first contacting the sealing plate 144 as the gate 116 moves from the first position to the second position. As the rockers 156a-156l transfer the further force from the drive mechanism 118 to the sealing plate 144, the sealing plate 144 can shift the stop 180 to a shifted position (FIG. 19) closer to the portal 110 than the starting position. The stop 180 can be resiliently biased toward the starting position. For example, the stop 180 can include a pocket 186, a rigid panel 188 extending upwardly from the pocket 186, and a v-shaped spring 190 positioned within the pocket 186 along a side of the panel 188 facing toward the portal 110. As the chamber valve 100 transitions from the third state to the second state, the v-shaped spring 190 can urge the panel 188 away from the portal 110 to move the stop 180 from the shifted position toward the starting position.

Similar to the stop 180, the first and second swing arms 132, 134 can be resiliently biased toward respective starting positions. The second swing arm 134 and associated components of the chamber valve 100 are now further described with reference to FIG. 13 with the understanding that the first swing arm 132 and associated components of the chamber valve 100 can have the same or similar configurations. As shown in FIG. 13, the second swing arm 134 can be rotatably connected to the gate 116 via the sealing plate 144. While the gate 116 moves between the first and second positions, the second swing arm 134 can move within a plane 192. As the rockers 156a-156l transfer the further force from the drive mechanism 118 to the sealing plate 144, the second swing atm 134 can tilt out of the plane 192 toward the portal 110. The second swing arm 134 can be resiliently biased toward alignment with the plane 192. For example, the third joint 140 can include a first Belleville washer 194 that biases the second swing arm 134 toward alignment with the plane 192. In addition or alternatively, the fourth joint 142 can include a second Belleville washer 196 that biases the second swing arm 134 toward alignment with the plane 192. As the chamber valve 100 transitions from the third state to the second state, the first and second Belleville washers 194, 196 can urge the second swing arm 134 to tilt away from the portal 110 so that movement of the gate 116 from the second position to the first position occurs within, parallel to, or nearly parallel to the plane 192.

FIG. 23 is modeling diagram showing 1000-times exaggerated deflection of the sealing plate 144 while the chamber valve 100 is in the third state and the sealing plate 144 is under a simulated force of 5000 lbf. FIG. 24 is modeling diagram showing 15-times exaggerated deflection of the spring plate 146 while the chamber valve 100 is in the third state and the spring plate 146 is under a simulated force of 4171 lbf. As shown in FIGS. 23 and 24, the spring plate 146 can be more flexible than the sealing plate 144. This can be useful, for example, to at least partially compensate for non-uniform resistance of the inwardly facing sealing member 182 to compression from the sealing plate 144. The sealing plate 144 can be configured to have a first maximum deflection toward the portal 110 while the inwardly facing sealing member 182 is compressed between the sealing plate 144 and the frame 102. Similarly, the spring plate 146 can be configured to have a second maximum deflection away from the portal 110 while the inwardly facing sealing member 182 is compressed between the sealing plate 144 and the frame 102. In at least some embodiments, the second maximum deflection is greater than the first maximum deflection, such as at least 10 times greater (e.g., with a range from 10 times to 100 times greater). In the modeled embodiment, the second maximum deflection is about 60 times greater than the first maximum deflection.

The sealing plate 144 and the spring plate 146 can be unitary structures or non-unitary structures. In a particular embodiment, the spring plate 146 is a composite structure made of a first spring-steel sheet 0.125 inch thick and a second spring-steel sheet 0.625 inch thick overlapping the first spring-steel sheet. The combined thicknesses of these spring-steel sheets can be selected to achieve a desired level of compression of the inwardly facing sealing member 182 (e.g., an o-ring flattened surface of about 0.12 inch). In other embodiments, the sealing plate 144 and the spring plate 146 can have other suitable forms.

FIG. 25 is a cross-sectional partial side profile view of the chamber valve 100 indicating forces acting on the rocker 156e while the chamber valve 100 transitions from the second state to the third state. As shown in FIG. 25, the rocker 156e can have an angle A1 relative to the sealing plate 144 that changes in response to force F1 from the drive mechanism 118 and force F2 from the sealing plate 144. In at least some embodiments, a mechanical advantage of the rocker 156e increases as the chamber valve 100 transitions from the second state to the third state. This can be useful, for example, to reduce a burden on the motor 120 while the inwardly facing sealing member 182 is highly compressed and the force F2 is relatively high. In a particular example, the angle A1 changes from 50 degrees to 90 degrees while the chamber valve 100 transitions from the second state to the third state. In this example, when the chamber valve 100 is in the third state there can be little or no need for the motor 120 to maintain the force F1 above zero. Although FIG. 25 only shows the rocker 156e, the other rockers 156a-d, 156f-l can have the same or similar properties.

FIG. 26 is a cross-sectional partial front profile view of the chamber valve 100 indicating forces acting on the connecting rod 124 while the chamber valve 100 transitions from the second state to the third state. As shown in FIG. 26, the crank 122 can have an angle A2 off horizontal and the connecting rod 124 can have an angle A3 off horizontal, with the sum of A2 and A3 being equal to a total angle between the crank 122 and the connecting rod 124. The angles A2 and A3 can change in response to force F3 from the crank 122 and force F4 from the gate 116 while the chamber valve 100 transitions from the second state to the third state. The crank 122 can be configured to rotate through a first rotational range as the gate 116 moves from the first position to the second position, and to rotate through a second rotational range while the gate 116 is in the second position. Rotation of the crank 122 within the second rotational range can cause the gate 116 to seal the portal 110. Similar to the rocker 156e, in at least some embodiments, a mechanical advantage of the crank 122 increases as the chamber valve 100 transitions from the second state to the third state. In a particular example, the sum of A2 and A3 can change from 150 degrees to 180 degrees while the chamber valve 100 transitions from the second state to the third state.

As also shown in FIG. 26, the shaft 123 can extend through the frame 102 and be configured to transfer rotary force from the motor 120 to the crank 122. The chamber valve 100 can include a rotary seal 198 extending circumferentially around the shaft 123 at a location along a length of the shaft 123 at which the shaft 123 extends through the frame 102. This configuration of the drive mechanism 118 and other configurations of drive mechanisms in accordance with at least some embodiments of the present technology can have one or more advantages relative to conventional counterparts. For example, the rotary seal 198 can be a ferrofluidic seal or another type of seal particular to rotary junctions that is well suited for restricting leakage of air into the peripheral volume 105 when the peripheral volume 105 is at a vacuum pressure. In contrast, seals (e.g., bellows and lip seals) typically used with linear junctions tend to be poorly suited for this application with respect to performance and/or durability.

FIG. 27 is a partial plan view of a vacuum-chamber system 200 in accordance with an embodiment of the present technology. The system 200 can include a first vacuum chamber 202 shaped to contain a workpiece (not shown) while the workpiece is processed under a first vacuum, and a second vacuum chamber 204 shaped to contain the workpiece while the workpiece is processed under a second vacuum. The system 200 can further include the chamber valve 100 disposed between the first and second vacuum chambers 202, 204. With reference to FIGS. 5 and 27 together, the portal 110 can be shaped to allow movement of the workpiece between the first and second vacuum chambers 202, 204. When the gate 116 is in the first position, the peripheral volume 105 can be open to the first and second vacuum chambers 202, 204. It can be useful for the frame 102 to restrict leakage of air into peripheral volume 105 to reduce or eliminate disruption of the first and second vacuums during movement of the workpiece between the first and second vacuum chambers 202, 204.

FIG. 28 is a flow chart illustrating a method 300 for operating the chamber valve 100 in accordance with an embodiment of the present technology. With reference to FIGS. 1-28 together, the method 300 can begin with the gate 116 in the first position offset from the portal 110. The method 300 can include rotating the crank 122 within a first rotational range (block 302) and thereby exerting force against the gate 116 in a direction parallel to the length of the gate 116 (block 304). This force, for example, can be transferred into the frame 102 as rotary force from the motor 120 to the crank 122 via the shaft 123. In response to the force, the gate 116 can move laterally and diagonally relative to the portal 110 from the first position toward the second position in which the gate 116 is aligned with the portal 110 (block 306). In conjunction with this movement of the gate 116, the first and second joints 136, 136 can be rotated and the first swing arm 132 can be moved within a first plane (block 308). Similarly, the third and fourth joints 140, 142 can be rotated and the second swing arm 134 can be moved within a second plane. In at least some cases, the first and second planes are the same or parallel. As it moves from the first position toward the second position, the gate 116 can move along the path 130, which can be arcuate and have a radius corresponding to a length of the first swing arm 132 between the first and second joints 136, 138 and/or a length of the second swing arm 134 between the third and fourth joints 140, 142.

When the gate 116 reaches the second position, the method 300 can include contacting a first portion of the gate 116 (e.g., the sealing plate 144) and the stop 180 (block 310). Next, the method 300 can include rotating the crank 122 within a second rotational range while the gate 116 is in the second position (block 312) and thereby exerting further force against the gate 116 in the direction parallel to the length of the gate 116 (block 314). For example, this further force can be transferred from the crank 122 to the gate 116 via the connecting rod 124 and via a second portion of the gate 116 (e.g., the spring plate 146). While the further force is exerted against the gate 116, the method 300 can include preferentially restricting further movement of the first portion of the gate 116 along the path 130 that the gate 116 traveled from the first position to the second position relative to further movement of the second portion of the gate 116 along the path 130. This restriction can occur, for example, due to contact between the first portion of the gate 116 and the stop 180. With further movement of the first portion of the gate 116 restricted, the further force acting on the gate 116 can be distributed along the length of the gate 116 (block 318). For example, the method 300 can include rotating the 156a-156l to distribute the further force acting on the gate 116.

The distributed force (e.g., via rotation of the rockers 156a-156l) can cause the first portion of the gate 116 to move toward the portal 110 and away from the second portion of the gate 116 (block 320), thereby moving the gate 116 from a low-profile first configuration toward an expanded second configuration. In conjunction with this movement of the first portion of the gate 116, the stop 180 can shift (e.g., against a resilient bias from the v-shaped spring 190) from a starting position to a shifted position closer to the portal 110 than the starting position (block 322). Furthermore, the first swing arm 132 can tilt (e.g., against a resilient bias from the first Belleville washer 194) out of the first plane (block 324). Similarly, the second swing arm 134 can tilt (e.g., against a resilient bias from the second Belleville washer 196) out of the second plane. The method 300 can further include compressing the inwardly facing sealing member 182 between the first portion of the gate 116 and the frame 102 (block 326) as the gate 116 moves toward the second configuration and while the crank 122 is rotated within the second rotational range. In response to force from the inwardly facing sealing member 182, the first and second portions of the gate 116 can resiliently deflect away from the portal 110. The resilient deflection of the second portion of the gate 116 can be greater than the resilient deflection of the first portion of the gate 116.

When the inwardly facing sealing member 182 is compressed between the first portion of the gate 116 and the frame 102, the chamber valve 100 can be closed and sealed. This state of the chamber valve 100 can be maintained, in at least some cases, without maintaining force on the gate 116 from the motor 120. Opening the chamber valve 100 can include reversing the method 300. As the gate 116 moves from the second position toward the first position, the chamber valve 100 can automatically reset to a default position. For example, the stop 180 can resiliently return to its starting position and the first and second swing arms 132, 134 can resiliently return to the first and second planes, respectively. When the chamber valve 100 is used within the vacuum-chamber system 200 and in other cases, operating the chamber valve 100 can include selectively opening and closing the portal 110 to accommodate movement of workpieces between the first and second vacuum chambers 202, 204. This can occur, for example, while a vacuum is maintained within the peripheral volume 105.

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments can also exhibit such advantages, and not all embodiments need necessarily exhibit such advantages or other advantages disclosed herein to fall within the scope of the present technology.

What is claimed is:

1. A chamber valve, comprising:
   a frame extending around an elongate portal;
   a gate operably connected to the frame, wherein the gate is moveable between:
      a first position in which the gate is offset from the portal, and
      a second position in which the gate is aligned with the portal;
   a swing arm extending between the frame and the gate;
   a first joint at which the swing arm is rotatably connected to the frame;
   a second joint at which the swing arm is rotatably connected to the gate; and
   a single drive mechanism operably connected to the gate;
   wherein:
      the gate shifts laterally and diagonally relative to the portal to move between the first and second positions;
      the single drive mechanism is configured to transfer force to the gate to move the gate between the first and second positions;
      the gate moves between the first and second positions along an arcuate path having a radius corresponding to a length of the swing arm between the first and second joints; and
      when or after the gate is in the second position, the single drive mechanism is further configured to transfer force to the gate to seal the gate around the elongate portal.

2. The chamber valve of claim 1, wherein:
   the portal has a length and a width; and
   the length of the portal is within a range from 10 to 30 times greater than a width of the portal.

3. The chamber valve of claim 1, wherein:
   the swing arm is a first swing arm;
   the chamber valve further comprises:
      a second swing arm extending between the frame and the gate,
      a third joint at which the second swing arm is rotatably connected to the frame, and
      a fourth joint at which the second swing arm is rotatably connected to the gate;
   the fourth joint is spaced apart from the second joint in a direction parallel to a length of the gate; and
   the length of the first swing arm between the first and second joints is equal to a length of the second swing arm between the third and fourth joints.

4. The chamber valve of claim 1, wherein the single drive mechanism is configured to convert a rotary force into first force that is applied to said gate before said gate is in said second position, and a second force that is applied to said gate when or after said gate is in said second position.

5. The chamber valve of claim 1, wherein:
   the frame defines a peripheral volume around the portal;
   the single drive mechanism includes:
      a motor outside the peripheral volume,
      a crank within the peripheral volume, and
      a shaft configured to transfer rotary force from the motor to the crank, wherein the shaft extends through the frame; and
   the chamber valve further comprises a rotary seal extending circumferentially around the shaft at a location along a length of the shaft at which the shaft extends through the frame.

6. The chamber valve of claim 5, wherein:
   the single drive mechanism comprises a crank that is configured to rotate through a first rotational range and a second rotational range;
   when the gate is in the first position, rotation of the crank within the first rotational range causes the transfer of force to said gate to move the gate from the first position to the second position; and
   when the gate is in the second position, rotation of the crank within the second rotational range causes the transfer of force to said gate to seal the gate around the elongate portal.

7. The chamber valve of claim 6, wherein a mechanical advantage of the crank increases as the crank rotates through the second rotational range.

8. A chamber valve, comprising:
   a frame extending around an elongate portal;
   a gate operably connected to the frame;
   a swing arm extending between the frame and the gate;
   a first joint at which the swing arm is rotatably connected to the frame;
   a second joint at which the swing arm is rotatably connected to the gate; and
   a single drive mechanism operably connected to the gate;
   wherein:
      the gate is moveable between:
         a first position in which the gate is offset from the portal, and
         a second position in which the gate is aligned with the portal;
      the gate shifts laterally and diagonally relative to the portal to move between the first and second positions;

the single drive mechanism is configured to transfer force to the gate to move the gate between the first and second positions; and when or after the gate is in the second position, the single drive mechanism is further configured to transfer force to the gate to seal the gate around the elongate portal;

the gate includes:
- a sealing plate having a first major surface facing toward the portal when the gate is in the second position, and an opposite second major surface,
- a spring plate parallel to the sealing plate and further from the portal than the sealing plate when the gate is in the second position, and
- a plurality of rockers, wherein individual rockers of the plurality of rockers are spaced apart along a length of the gate;

before the gate is in the second position, the single drive mechanism is configured to exert a first force against the gate via the spring plate to move the gate along a path extending between the first and second positions;

the frame includes a stop that resists further movement of the sealing plate along the path while the gate is in the second position; and when or after the gate is in the second position, the plurality of rockers transfers a second force exerted against the gate by the single drive mechanism to the sealing plate via the spring plate to move the sealing plate toward the portal and away from the spring plate.

9. The chamber valve of claim 8, further comprising a resilient sealing member extending around the portal, wherein the plurality of rockers is further configured to transfer the second force to the sealing plate to compress the sealing member between the sealing plate and the frame.

10. The chamber valve of claim 8, wherein a mechanical advantage of the plurality of rockers increases as the plurality of rockers transfers the second force to the sealing plate.

11. The chamber valve of claim 8, wherein the spring plate is more flexible than the sealing plate.

12. The chamber valve of claim 8, wherein:
the single drive mechanism is operably connected to the spring plate at a first end portion of the gate; and
the stop resists the further movement of the sealing plate by contacting the sealing plate at an opposite second end portion of the gate.

13. The chamber valve of claim 12, wherein:
the stop has a starting position when out of contact with the sealing plate;
the sealing plate shifts the stop to a shifted position closer to the portal than the starting position as the plurality of rockers transfers the second force to the sealing plate; and
the stop is resiliently biased toward the starting position.

14. The chamber valve of claim 8, wherein:
the swing arm is rotatably connected to the gate via the sealing plate;
the swing arm moves within a plane as the gate moves between the first and second positions;
the swing arm tilts out of the plane as the plurality of rockers transfers the second force to the sealing plate; and
the swing arm is resiliently biased toward alignment with the plane.

* * * * *